United States Patent
Inoue et al.

(10) Patent No.: US 9,417,363 B2
(45) Date of Patent: Aug. 16, 2016

(54) OPTICAL SHEET, SURFACE LIGHT SOURCE DEVICE AND TRANSMISSION-TYPE DISPLAY DEVICE

(75) Inventors: Mitsuru Inoue, Okayama (JP); Amane Koike, Saitama (JP); Akiko Tomita, Minamisaitama-Gun (JP); Hiroshi Kojima, Kawagoe (JP); Akinobu Ushiyama, Moriya (JP); Satoshi Goishihara, Kazo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 623 days.

(21) Appl. No.: 12/918,834

(22) PCT Filed: Jul. 17, 2009

(86) PCT No.: PCT/JP2009/062981
§ 371 (c)(1),
(2), (4) Date: Aug. 23, 2010

(87) PCT Pub. No.: WO2010/008070
PCT Pub. Date: Jan. 21, 2010

(65) Prior Publication Data
US 2010/0315803 A1 Dec. 16, 2010

(30) Foreign Application Priority Data
Jul. 18, 2008 (JP) ................ 2008-187290

(51) Int. Cl.
G09F 13/04 (2006.01)
G02B 3/00 (2006.01)
(Continued)

(52) U.S. Cl.
CPC ............ *G02B 3/0068* (2013.01); *G02B 5/0231* (2013.01); *G02B 5/0278* (2013.01); *G02F 1/1303* (2013.01); *G02F 2001/133607* (2013.01)

(58) Field of Classification Search
CPC .............. G02B 3/0006; G02B 5/0231; G02B 2003/0093
USPC ................. 362/611, 558, 616–620, 606–607, 362/97.2–97.3; 359/599; 349/64
See application file for complete search history.

(56) References Cited

U.S. PATENT DOCUMENTS 3,267,278 A * 8/1966 Doolittle ............ 362/309
5,649,754 A * 7/1997 Matsumoto .......... 362/618
(Continued)

FOREIGN PATENT DOCUMENTS

JP 08-043634 A1 2/1996
JP 2000-292790 A1 10/2000
(Continued)

*Primary Examiner* — Sean Gramling
(74) *Attorney, Agent, or Firm* — Burr & Brown, PLLC

(57) ABSTRACT

An optical sheet including a fly-eye lens is provided, which exhibits excellent optical functions, including desired light condensing ability, light diffusing ability and an ability for rendering a light source image substantially invisible, and can be produced with high reproducibility. The optical sheet includes a sheet-like main body, first unit shaped elements arranged on one surface of the main body and together constituting the fly-eye lens; and second unit shaped elements arranged on the one surface of the main body and extending in parallel with one direction on the sheet surface of the main body. The first unit shaped elements are arranged, with a space provided therebetween, on the one surface of the main body, while the second unit shaped elements are arranged between the first unit shaped elements on the one surface of the main body.

14 Claims, 5 Drawing Sheets

(51) Int. Cl.
   *G02B 5/02* (2006.01)
   *G02F 1/13* (2006.01)
   *G02F 1/1335* (2006.01)

(56) References Cited

U.S. PATENT DOCUMENTS

| | | | | |
|---|---|---|---|---|
| 5,771,328 A * | 6/1998 | Wortman et al. | | 385/146 |
| 6,213,625 B1 * | 4/2001 | Leadford et al. | | 362/331 |
| 6,606,133 B1 | 8/2003 | Okabe | | |
| 7,344,282 B2 | 3/2008 | Kim et al. | | |
| 7,623,293 B2 * | 11/2009 | Yao et al. | | 359/619 |
| 7,645,057 B2 | 1/2010 | Kim et al. | | |
| 7,684,119 B2 * | 3/2010 | Lissotschenko et al. | | 359/623 |
| 7,712,932 B2 * | 5/2010 | Parker et al. | | 362/337 |
| 7,804,564 B2 * | 9/2010 | Min et al. | | 349/112 |
| 8,186,867 B2 * | 5/2012 | Chen | G02B 6/0036 | 362/623 |
| 2006/0256582 A1 * | 11/2006 | Chuang | | 362/620 |
| 2008/0049165 A1 * | 2/2008 | Min | G02B 3/0043 | 349/64 |
| 2008/0049330 A1 * | 2/2008 | Tolbert et al. | | 359/599 |
| 2008/0137367 A1 | 6/2008 | Kim et al. | | |
| 2009/0122576 A1 | 5/2009 | Sato et al. | | |
| 2009/0323308 A1 * | 12/2009 | Chang | | 362/97.1 |

FOREIGN PATENT DOCUMENTS

| | | |
|---|---|---|
| JP | 3309173 B2 | 5/2002 |
| JP | 2006-301582 A1 | 11/2006 |
| JP | 2007-034116 A1 | 2/2007 |
| JP | 2008-070456 A1 | 3/2008 |
| JP | 2008-152253 A1 | 7/2008 |
| WO | 2007/020820 A1 | 2/2007 |

\* cited by examiner

| SAMPLES | | COMPARATIVE EXAMPLE A | EXAMPLE A | EXAMPLE B | EXAMPLE C | EXAMPLE D |
|---|---|---|---|---|---|---|
| EXTERNAL APPEARANCE | | | | | | |
| FIRST UNIT SHAPED ELEMENTS | HEIGHT H1 (μm) | 28 | 28 | 28 | 28 | 28 |
| | WIDTH W1 (μm) | 78 | 78 | 78 | 78 | 78 |
| | PITCH P1 (μm) | 82 | 90 | 120 | 180 | 240 |
| | AVERAGE OF THE LEAST SPACE Sa (μm) | 4 | 12 | 42 | 102 | 162 |
| | PACKING RATIO (%) | 82.1 | 68.1 | 38.3 | 17.0 | 9.6 |
| SECOND UNIT SHAPED ELEMENTS | VERTEX ANGLE θ (°) | — | 90 | 90 | 90 | 90 |
| | PITCH P2 (μm) | — | 37 | 37 | 37 | 37 |
| FRONT BRIGHTNESS (%) | | 100 | 97.5 | 102.3 | 105.1 | 106.1 |
| HIDING RATIO I (%) | | 104.3 | 102.6 | 101.8 | 101.4 | 101.1 |
| ANGLE OF VISIBILITY (°) | αH | 50.3 | 54.3 | 53.8 | 53.3 | 52.3 |
| | αV | 46.0 | 42.3 | 37.8 | 36.0 | 35.3 |

FIG. 10

OPTICAL SHEET, SURFACE LIGHT SOURCE DEVICE AND TRANSMISSION-TYPE DISPLAY DEVICE

FIELD OF THE INVENTION

The present invention relates to an optical sheet adapted for changing a travel direction of light, and in particular relates to the optical sheet that can exhibit excellent optical functions as well as can be produced with high reproducibility. This invention also relates to a surface light source device and a transmission-type display device, having such an excellent optical sheet.

BACKGROUND OF THE INVENTION

In general, the surface light source device used for the transmission-type display device includes a light source, and a plurality of optical sheets (or optical films) that can serve to change the travel direction of the light emitted from the light source. Among these optical sheets, a light diffusing sheet that can serve to diffuse the light emitted from the light source, thus blurring an image of the light source (or rendering the light source image inconspicuous or substantially invisible), and a light collecting sheet (light condensing sheet) that can serve to collect (condense) the light travel direction in a front direction, thereby enhancing the front brightness (i.e., the brightness observed in the front direction) are included. With this surface light source device including a proper combination of the light diffusing sheet having excellent light diffusing ability and the light collecting sheet having adequate light collecting ability (light condensing ability), the transmission-type display device that can exhibit desired front brightness and an adequate angle of visibility as well as control the light source image to be more inconspicuous can be produced.

As the light diffusing sheet, the optical sheets containing proper light diffusing particles, each adapted for isotropically diffusing the light, optical sheets having a concavo-convex surface (or matted surface) and the like are well known.

As the light collecting sheets, the optical sheets, including unit shaped elements (or unit optical elements) extending along a straight line and arranged orthogonally to the longitudinal direction of each element (this arrangement manner is the so-called "linear arrangement"), are widely used. Typically, each of the unit shaped elements has a triangular, elliptical or circular shape on a cross section orthogonal to the longitudinal direction thereof. Such a light collecting sheet can serve to positively enhance the front brightness as well as can reduce in-plane variation of the front brightness attributable to specific construction of the light source and thus control the image of the light source to be more inconspicuous. Besides, this light collecting sheet can also serve to smoothly change angular distribution of the brightness centered on the front direction. That is to say, this light collecting sheet also has a light diffusing function. For instance, as disclosed in JP3309173B, in the case in which each of the unit shaped elements has the triangular cross section shape, the function for enhancing the front brightness (or light condensing function) tends to be strongly exhibited, while the function for smoothly changing the angular distribution of the brightness centered on the front direction is not exhibited so strongly. Meanwhile, in the case in which each of the unit shaped elements has the elliptical or circular cross section, the function for smoothly changing the angular distribution as well as uniforming the in-plane distribution of the brightness (or light diffusion function) tends to be strongly exhibited.

Further, JP2008-70456A discloses to form a curved surface portion on the unit shaped elements (or lens bodies) included in the light collecting sheet (light condensing sheet) such that the curved surface portion is projected from the unit shaped elements. According to the disclosure of this JP2008-70456A, the projected curved surface on the unit shaped elements can provide some light diffusing function to the light collecting sheet. Further, as reported in this JP2008-70456A, the provision of such a relatively excellent light diffusion function to the light collecting sheet is intended for reducing the number of the optical sheets to be incorporated in the surface light source device.

However, as disclosed in paragraphs [0036], [0059], [0060] and the like in the above JP2008-70456A, only the fact that the optical function (mainly the light condensing function) of the unit shaped elements (or lens bodies) and the optical function (mainly the light diffusing function) of the projected curved surfaces can be exhibited, independently of each other, is described. That is to say, from such a technique disclosed in JP2008-70456A, it cannot be expected to obtain some combined effect of the optical function of the unit shaped elements (or lens bodies) and the optical function of the projected curved surfaces. That is to say, the projected curved surfaces, as described in JP2008-70456A, are arranged on the unit shaped elements, along a direction in which this unit shaped element extends. Accordingly, depending on the weighting balance between the light condensing function and the light diffusing function, the ratio of the area that is occupied by such a projected curved surface relative to the whole surface of the unit shaped elements will be controlled. That is to say, even though the use of such a light collecting sheet disclosed in JP2008-70456A can reduce, to some extent, the number of the optical sheets to be incorporated in the surface light source device, it can be guessed from the disclosure of JP2008-70456A that this surface light source device including a light collecting sheet disclosed in JP2008-70456A cannot exhibit more excellent optical properties than that exhibited by a usual surface light source device including a usual light collecting sheet with no projected curved surface portions and a usual light diffusing sheet.

By the way, it is important to note that this light collecting sheet can change the light travel direction in a plane extending along the direction (or arrangement direction) in which the unit shaped elements are arranged. In addition, by incorporating two such light collecting sheets in the surface light source device, with the arrangement direction of the unit shaped elements in one light collecting sheet set to be orthogonal to the arrangement direction of the unit shaped elements in the other light collecting sheet, the distribution of the brightness can be well controlled, in such orthogonal two directions (typically, in vertical and horizontal directions of the sheet), on a display surface.

Further, in recent years, the so-called fly-eye lens including the unit shaped elements (or unit optical elements) arranged thereon, in different two directions, at random or regularly, has attracted significant attention in this field (e.g., see JP2006-301582A). Theoretically, the optical sheet (or fly-eye lens sheet) including this fly-eye lens can eliminate the need of using such a large number of optical sheets as described above. That is to say, by using only one optical sheet of this type, the light transmitted therethrough can be adequately collected (condensed) as well as diffused in the two directions (typically, in the vertical and horizontal directions of the sheet), on the display surface. Such reduction in the number of the optical sheets incorporated in the surface light source device is quite advantageous, because this reduction can directly lead to substantial reduction of the production cost of the surface light source device.

At present, however, either of the light collecting function (light condensing function) and light diffusing function of the fly-eye lens sheet does not yet attain a desired level. Therefore, in order to obtain these optical functions on the desired level, it is necessary to incorporate two or more fly-eye lenses into the surface light source device, thus making it rather difficult to achieve the substantial reduction of the production cost of the surface light source device.

Usually, the optical sheet is formed, by molding, with a proper radiation-curing resin (generally, a UV-curing resin). In the case of molding the fly-eye lens composed of a plurality of semi-spherical unit shaped elements (or unit lenses), a mold used for molding this fly-eye lens includes recesses having a shape closed along the whole circumference thereof upon the molding. Therefore, air may tend to enter and remain in a gap between the mold and the radiation-curing resin injected therein. In this case, an unwanted air bubble (or bubbles) is formed in the molded unit shaped elements, or otherwise a recessed defect (or defects) is formed in the surface of the molded unit shaped elements. Such a phenomenon may disable the fly-eye lens from adequately exhibiting desired and/or predetermined optical functions.

SUMMARY OF THE INVENTION

The present invention was made in light of the above problems. Therefore, it is an object of this invention to provide a optical sheet including the fly-eye lens, which can exhibit excellent optical functions as well as can be produced with high reproducibility. It is another object of this invention to provide the surface light source device and transmission-type display device including the optical sheet.

Generally, as compared with the mold for producing the optical sheet including the unit shaped elements linearly arranged thereon, the cost for preparing the mold for producing the prior art fly-eye lens sheet including the unit shaped elements arranged in the two different directions thereon is considerably high. Thus, the production cost of this fly-eye lens sheet should be raised so much. Therefore, it is very preferable that the optical sheet capable of exhibiting significantly excellent optical functions can be produced, without unduly increasing the production cost, unlike the case of such a prior art fly-eye lens sheet as described above.

The optical sheet of the present invention includes: a sheet-like main body; first unit shaped elements arranged on one surface of the main body, the first unit shaped elements constituting together a fly-eye lens; and second unit shaped elements arranged on the one surface of the main body, the second unit shaped elements extending in parallel with one direction on a sheet surface of the main body, wherein the first unit shaped elements are arranged, with a space provided therebetween, on the one surface of the main body, and wherein the second unit shaped elements are arranged, between the first unit shaped elements, on the one surface of the main body.

In the optical sheet of this invention, each of the first unit shaped elements may have a shape corresponding to a part of an ellipse or a part of a circle, in a section thereof parallel with the normal direction relative to the sheet surface of the main body.

Additionally, in the optical sheet of this invention, each of the second unit shaped elements may have a triangular shape, in a section thereof parallel with the normal direction relative to the sheet surface of the main body and orthogonal to the one direction.

Further, in the optical sheet of this invention, a partial area of the one surface of the main body may be covered with the first unit shaped elements, while all of the other area than the partial area of the one surface of the main body may be covered with the second unit shaped elements.

Further, in the optical sheet of this invention, the height of projection of each of the second unit shaped elements from the one surface of the main body may be equal to or less than $9/10$ of the height of the projection of each of the first unit shaped elements from the one surface of the main body.

Further, in the optical sheet of this invention, the first unit shaped elements may be arranged, in a first direction, with a constant pitch, along the sheet surface of the main body, while being also arranged, in a second direction, with the constant pitch, along the sheet surface of the main body, wherein the first direction crosses to the second direction, while defining a 60° angle therebetween.

Further, in the optical sheet of this invention, an average of the least space between the first unit shaped elements may be equal to or greater than an arrangement pitch of the second unit shaped elements along a direction orthogonal to the one direction on the sheet surface of the main body, wherein the average of the least space corresponds to the average of the space along the sheet surface of the main body between one of the first unit shaped elements and other first unit shaped elements arranged nearest to the one first unit shaped element along the sheet surface of the main body. Additionally, in this optical sheet of the present invention, the first unit shaped elements may be arranged, in the first direction, with the constant pitch, along the sheet surface of the main body, while the first unit shaped elements are also arranged, in the second direction, with the constant pitch, along the sheet surface of the main body, wherein the first direction may be orthogonal to the one direction, while crossing to the second direction, with the 60° angle defined therebetween. Alternatively, in this optical sheet of the present invention, the first unit shaped elements may be arranged in a random manner on the one surface of the main body.

The surface light source device of the present invention includes: the light source; and any one of the optical sheets described above and arranged to receive the light emitted from the light source.

The surface light source device of this invention may further include the light collecting sheet including unit shaped elements, each having the triangular section shape.

Additionally, the surface light source device of this invention may further include a polarized-light separating film located on the light outgoing side relative to the optical sheet.

The transmission-type display device of the present invention may includes: a transmission-type display unit; and any one of the surface light source devices described above and disposed to be opposed to the transmission-type display unit.

A method for producing the optical sheet of the present invention is provided for producing any one of the optical sheets described above, by the molding using the mold, and includes the steps of: supplying a material having a fluidity (flow property) into the mold; curing the material supplied into the mold in this mold; and unmolding the so-cured material from the mold, wherein in the step of supplying the material having the fluidity, the material is filled into the mold, while the material flows along a direction corresponding to the one direction of the optical sheet to be formed in the mold. This method for producing the optical sheet of the present invention can successfully avoid or substantially eliminate unwanted incorporation of air into each recessed portion formed in the mold for molding each of the first unit shaped elements for constituting the fly-eye lens. As such, undesired formation of air bubbles in the optical sheet including the fly-eye lens can be prevented, as well as unnecessary formation of recessed defects in the surface of the optical sheet can be avoided. That is to say, this method can achieve stable and reproducible production of such optical sheets that can exhibit desired and predetermined optical functions.

In the step of unmolding the cured material from the mold in the method for producing the optical sheet of this invention, the cured material may be pulled away, gradually, from the mold, along the one direction.

Additionally, in the method for producing the optical sheet of this invention, the mold may be formed into a roll-type mold having a cylindrical molding surface, wherein the step of supplying the material, the step of curing the material, and the step of unmolding the cured material may be performed, in succession, on the molding surface, during one rotation of the mold about a central axis thereof.

The mold used in the method of this invention is designed for producing any one of the optical sheets described above, by the molding, and is formed into the roll-type mold having the cylindrical molding surface. This molding surface has recessed portions corresponding to the first unit shaped elements and prism-forming grooves corresponding to the second unit shaped elements, such recessed portions and prism-forming grooves being formed in the molding surface. The prism-forming grooves extend, circumferentially, along the molding surface, about the central axis thereof, or otherwise the prism-forming groove extends, spirally, along the molding surface, about the central axis thereof. In the case of producing the optical sheet, from a proper resin, by the molding method using the mold related to this invention, the incorporation of the air into each recessed portion formed in the mold for molding each of the first unit shaped elements for constituting the fly-eye lens can be successfully avoided. Therefore, the formation of the air bubbles in the optical sheet including the fly-eye lens can be prevented, as well as the formation of the recessed defects in the surface of the optical sheet can be avoided. That is to say, this mold can achieve the stable and reproducible production of such optical sheets that can exhibit desired and predetermined optical functions.

Therefore, the present invention can provide such an improved optical sheet including the fly-eye lens that can exhibit excellent optical functions including both of excellent light collecting function (light condensing function) and excellent light diffusing function which are well controlled or balanced. In addition, the optical sheet including the fly-eye lens of this invention can be produced, with high reproducibility, without any occurrence of the unwanted recessed defects or the like in the sheet.

BRIEF DESCRIPTION OF THE DRAWINGS

FIG. 10 is a table showing the construction and assessment results of the optical sheets respectively incorporated in the transmission-type display devices respectively related to Examples A to D as well as related to a Comparative Example A.

DETAILED DESCRIPTION OF THE INVENTION

Hereinafter, one exemplary embodiment of the present invention will be described with reference to the drawings. In these drawings, each part and/or member is schematically shown, and proper alteration and exaggeration from real things, in sizes, scales and the like, in both of the vertical and horizontal directions, are utilized for better understanding and clarity of the invention.

Figure 1:
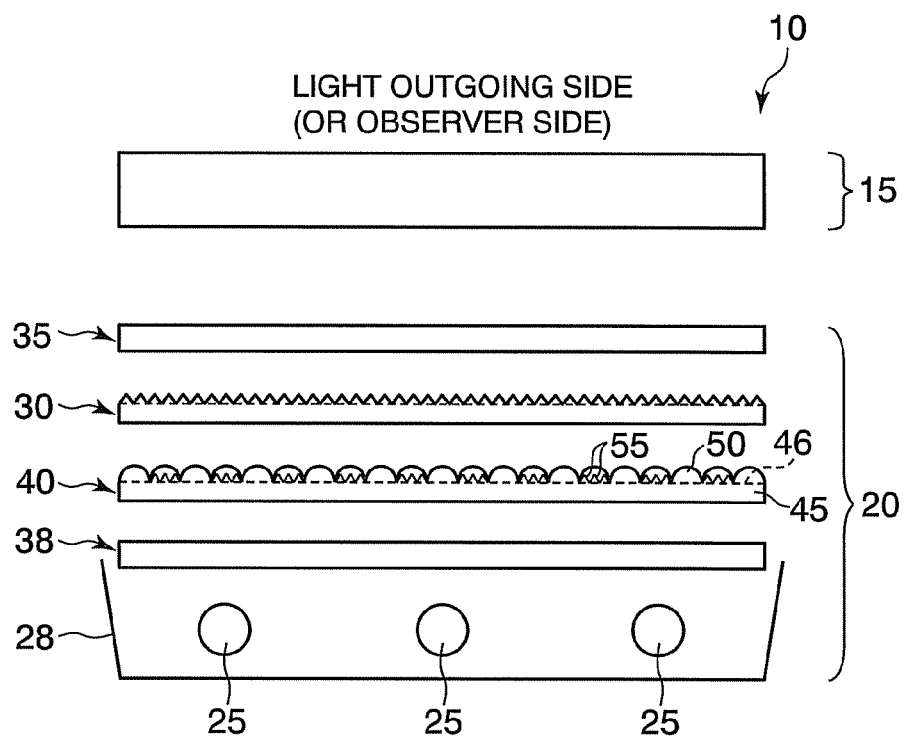
FIG. 1 is a diagram for illustrating one embodiment of the present invention, and shows a cross section schematically illustrating construction of the transmission-type display device and surface light source device.
Figure 2:
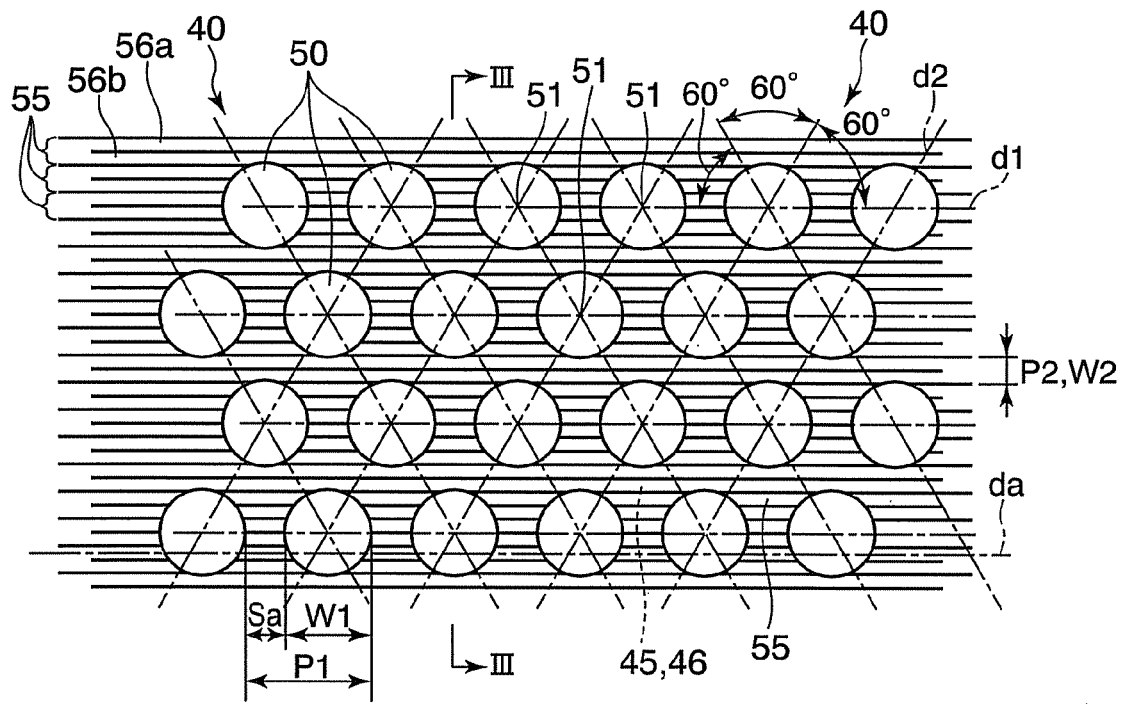
FIG. 2 is a top view of the optical sheet incorporated in the surface light source device shown in FIG. 1.
Figure 3:
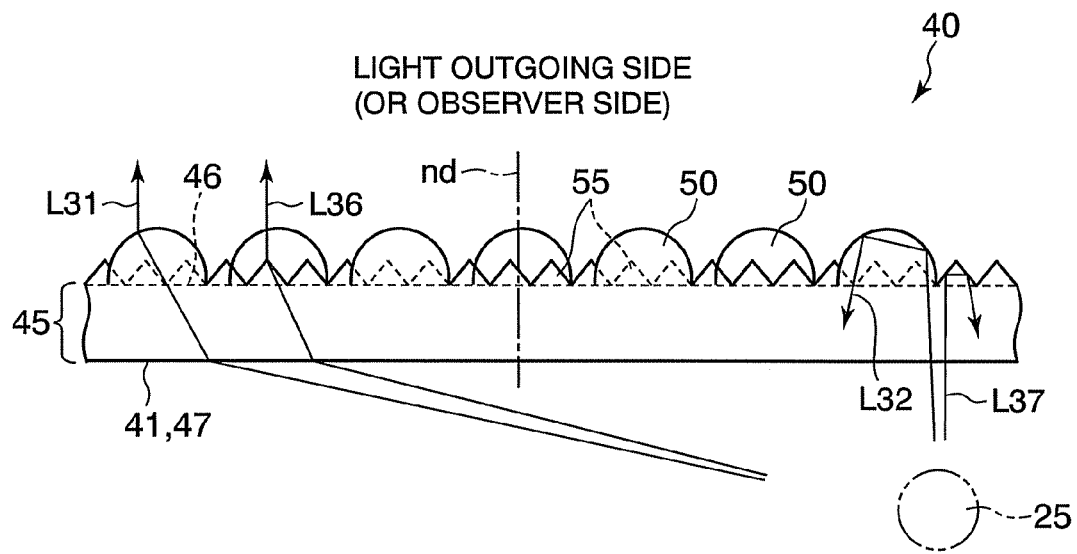
FIG. 3 is a diagram for explaining the function of the optical sheet shown in FIG. 2, and shows a cross section of the optical sheet taken along line in FIG. 2.
Figure 4:
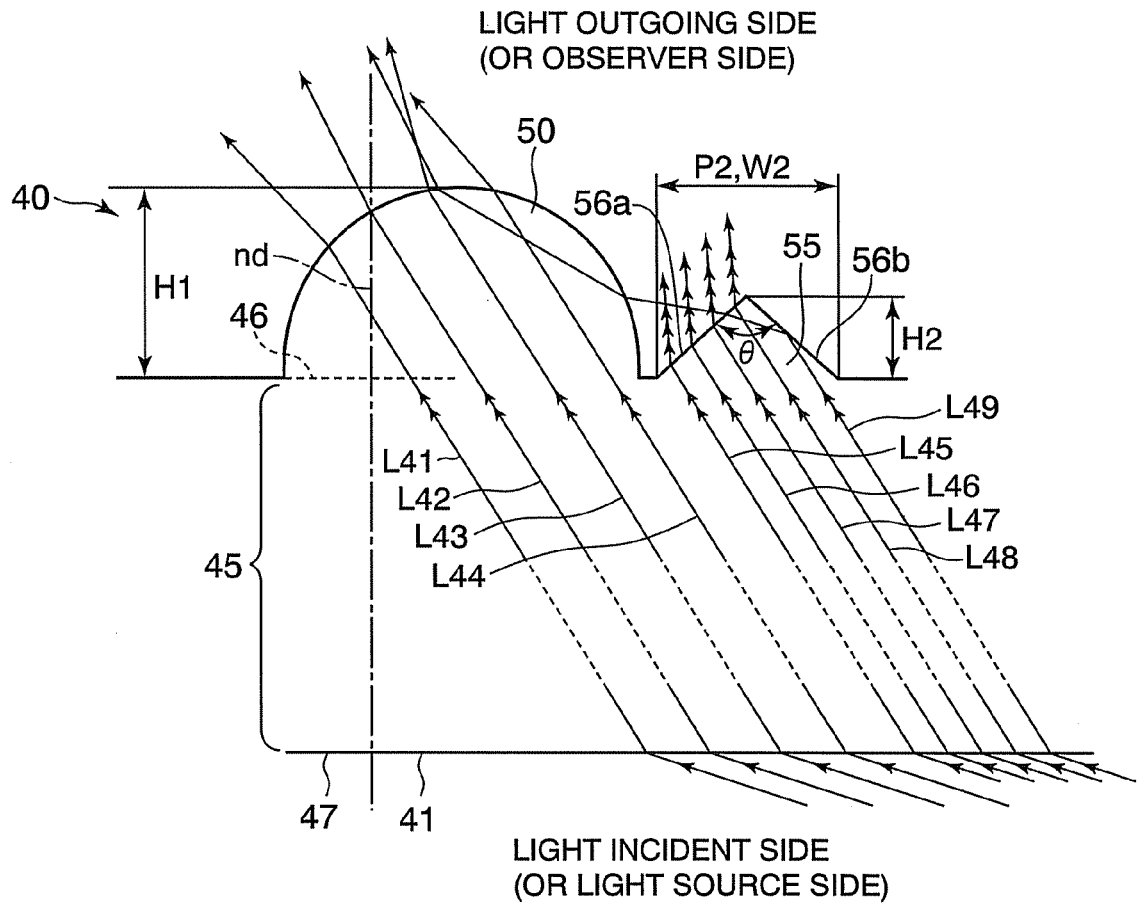
FIG. 4 is a diagram corresponding to a part of the cross section of FIG. 3 and is a diagram for explaining the function of each unit shaped element included in the optical sheet shown in FIG. 2.

FIGS. 1 through 7 are provided for illustrating the embodiment of the present invention. Among these drawings, FIG. 1 is the cross section for schematically illustrating the construction of the transmission-type display device and surface light source device, FIG. 2 is the top view of the optical sheet, and FIGS. 3 and 4 are the cross sections respectively taken along the normal direction relative to the sheet surface of the optical sheet.

The transmission-type display device 10 shown in FIG. 1 includes the transmission-type display unit 15, and the surface light source device 20 located on the rear face side of the transmission-type display unit 15 and adapted for planarly illuminating the transmission-type display unit 15 on the rear face side of the display unit 15. For instance, the transmission-type display unit 15 is composed of a liquid crystal display panel (or LCD panel). In this case, the transmission-type display device 10 serves as a liquid crystal display device. This LCD panel commonly includes a pair of substrates formed of a glass plate or the like, a liquid crystal material filled between the two substrates, and electrodes, each adapted for controlling orientation of some molecules of the liquid crystal material, for each domain corresponding to one pixel or picture element, with a certain electric field. That is to say, the molecules of the liquid crystal material filled between the two substrates are designed, such that the orientation and/or arrangement thereof can be optionally changed, for each domain corresponding to one pixel or picture element. That is to say, the liquid crystal display unit or panel 15 can serve as a shutter adapted for creating a desired image thereon, by selectively transmitting or blocking the light emitted with uniform in-plane brightness distribution (in-plane luminance distribution) from the surface light source device 20, for each domain corresponding to each pixel or picture element.

Meanwhile, the surface light source device 20, as shown in FIG. 1, includes the surface light source 25, the optical sheet 40 adapted for deflecting the travel direction of the light emitted from the light source 25 and then transmitting such deflected light therethrough, the light collecting sheet (light condensing sheet) 30 located on the light outgoing side (light exiting side, light emerging side) of the optical sheet 40, and the polarized-light separating film 35 located on the light outgoing side of the light collecting sheet 30. Further, the light diffusing sheet 38 adapted for diffusing the light is provided on the light incident side (light entarance side, light inputting side) of the optical sheet 40. While the surface light source device 20 may be provided in various forms, such as an edge-light (or side-light) type device or the like, the device 20 described in this embodiment is provided as a direct backlight type unit. Therefore, this light source 25 is located on the light incident side of the optical sheet 40 to be directly opposed to the optical sheet 40. Further, the light source 25 is surrounded by or covered with a box-like reflector 28 having an opening (or window) opened toward the optical sheet 40.

The term "light outgoing side (light exiting side, light emerging side)" herein refers to downstream side (observer side, the upper side in FIGS. 1, 3 and 4) in the direction of light that travels from a light source 25 toward a observer, passing through an optical sheet 40, etc., without turning back. Meanwhile, the term "light incident side (light entarance side, light inputting side)" herein refers to upstream side in the direction of light that travels from the light source 25 toward a observer, passing through the optical sheet 40, etc., without turning back.

Further the terms "sheet," "film" and "plate" are not intended to herein discriminate one from another, based on the difference in such literal expressions. That is to say, the term "sheet" may be used herein for expressing such a part or member that can also be referred to as the "film or plate."

In addition the term "sheet surface (or film surface or plate surface)" refers herein to the surface extending along a plane direction of each sheet-like part or member of interest, when such a sheet-like part or member is seen wholly and globally. For instance, in this embodiment, the sheet surface of the optical sheet 40, the sheet surface of the light collecting sheet 30, the film surface of the polarized-light separating film 35, the sheet surface of the light diffusing sheet 38, a light emitting surface of the surface light source device 15, and a display surface of the transmission-type display device 10 are parallel to one another. Further, as used herein, "the front direction" means the direction of the normal line nd (see FIG. 3) to the sheet surface of the optical sheet 40, and also corresponds to the normal direction relative to the light emitting surface of the surface light source device 20.

Further, the light source 25 may be provided in various aspects, such as fluorescent light lamps including linear cold-cathode tubes, LEDs (Light Emitting Diodes) as point-like light source, incandescent lamps, a planar EL (Electro-luminescent Light source) and the like. In this embodiment, however, as shown in FIG. 1 and FIG. 3 (by a two-dot chain line), the light source 25 includes a plurality of cold-cathode tubes extending linearly (extending along a straight line). The reflector 28 is provided for reflecting the light emitted from the light source 25 toward the optical sheet 40. Therefore, at least an inner surface of the reflector 28 is formed of a material having relatively high reflectance, such as a metal or the like.

The light collecting sheet (light condensing sheet) 30 is provided as the sheet-like member that can serve to change the travel direction of the light incident on the light incident side of the light collecting sheet 30 and then allow the light exit from the light outgoing side of the light collecting sheet 30, thereby to positively enhance the front brightness (front luminance). In one example shown in FIG. 1, the light collecting sheet 30 includes a plurality of unit shaped elements (or unit optical elements) arranged in a certain direction (or arrangement direction) on the sheet surface. Each unit shaped element extends, linearly (or extend along a straight line), in a direction orthogonal to the arrangement direction, on the sheet surface of the light condensing sheet 30. When seen in a cross section orthogonal to the longitudinal direction, each of the unit shaped elements has an isosceles right triangle shape. As the light collecting sheet 30 of this type, a "BEF®" sheet available from US-3M Corporation can be mentioned.

The polarized-light separating film 35 is provided as the sheet-like member having a function for transmitting therethrough a certain polarized component of the light incident thereon, depending on a polarized state of the incident light, while reflecting and returning the other polarized components of the incident light toward the light source. As the polarized-light separating film 35 that can also serve to enhance the brightness (luminance), a "DEBF®" film available from the US-3M Corporation can be mentioned.

The light diffusing sheet 38 is provided as the sheet-like member that can serve to diffuse the light incident thereon, more preferably diffuse isotropically the incident light, thereby to mitigate unevenness of the brightness attributable to the construction of the light source 25, in other wards, to obscure image of the light source, more specifically the unevenness of the brightness attributable to the arrangement of light emitting tubes (i.e., the cold-cathode tubes) constituting together the light source 25, thus uniforming the in-plane distribution of the brightness. As the light diffusing sheet 38, a sheet including a base part and light diffusing particles appropriately dispersed in the base part can be used. As one example, the light diffusing function can be provided to the light diffusing particles, such as by forming those particles from a material having relatively high reflectance, or by forming those particles from a material having a refractive index substantially different from a refractive index of the material used for forming the base part.

Now, the optical sheet 40 will be described.

As shown in FIGS. 2 and 3, the optical sheet 40 includes the sheet-like main body (main body portion) 45, the multiple first unit shaped elements (or first unit optical elements) 50 arranged two-dimensionally on the one surface 46 of the sheet-like main body 45, and the multiple second unit shaped elements (or second unit optical elements) 55 arranged on the one surface 46 of the sheet-like main body 45. As shown in FIG. 2, the first unit shaped elements 50 are arranged, with a proper space, on the one surface 46 of the main body 45. Meanwhile, the second unit shaped elements 55 are positioned between the first unit shaped elements 50 on the one surface 46 of the main body 45. In this embodiment, the whole area of the one surface 46 of the main body 45 is covered with the first unit shaped elements 50 and second unit shaped elements 55. More specifically, a part of the area of the one surface 46 of the main body 45 is covered with the first unit shaped elements 50, and all of the remaining area of the one surface 46 of the main body 50 is covered with the second unit shaped elements 55.

In this embodiment, as shown in FIGS. 3 and 4, the main body 45 has the other surface 47 opposite to the one surface 46, wherein this surface 47 is flat and constituting an light incident side surface 41 of the optical sheet 40. As used herein, the term "flat" means "optically flat." That is to say, the light incident side surface 41 of the optical sheet 40 (i.e., the other surface 47 of the main body 45) is designed and/or configured to refract visible light, at some rate, while satisfying the Snell's law. Accordingly, assuming that the so-called ten-point average roughness Rz (see JISB0601) of the other surface 47 of the main body 45 (i.e., the light incident side surface 41 of the optical sheet 40) is set to be equal to or less than the shortest visible-light wavelength (i.e., 0.38 µm), such a surface can be duly referred to as the "flat" surface herein.

Next, the first unit shaped elements 50 will be discussed. The multiple first unit shaped elements 50 are provided to constitute together the fly-eye lens. "The fly-eye lens" refers herein to a lens member including multiple unit lenses arranged, with a regular interval or irregular interval (i.e., at random), in different two directions on a plane.

In this embodiment, as shown in FIG. 2, the multiple first unit shaped elements 50 are arranged on the one surface 46 of the main body 45, such that congruent circles, each corresponding to a projection of each of the first unit shaped elements 50 onto the surface 46, can be arranged on the surface 46 of the main body 45, while being slightly spaced away from one another, as compared with a two-dimensional closed-packed structure of such circles on the same surface 46. That is to say, as shown in FIG. 2, each of the first unit shaped elements 50 is surrounded by other six rotationally symmetric unit shaped elements 50, with an equal interval. This structure corresponds to the arrangement that the first unit shaped elements are positioned, while being slightly spaced away from one another, as compared with the so-called hexagonal close-packed structure. In other words, the multiple first unit shaped elements 50 are arranged, with an equal pitch, in the two different directions on the one surface 46 of the main body 45, while such two different arrangement directions of the unit shaped elements 50 cross to each other, with an angle of 60° defined therebetween. That is to say, as shown in FIG. 2, the multiple first unit shaped elements 50 are arranged, with the equal pitch, in a first direction d1, on the sheet surface of the main body 45, while being also arranged, with the same pitch, in a second direction d2, on the sheet surface of the main body 45. In this case, the first direction d1 crosses to the second direction d2, while defining the 60° angle therebetween. Further, in other words, the multiple unit shaped elements 50 are arranged, such that three of the first unit shaped elements 50, positioned nearest to one another, can have centers 51 thereof positioned at the apexes of each regular triangle correspondingly defined on the one surface 46 of the main body 45.

As described above, the light source 25 is composed of the plurality of linear cold-cathode tubes. Meanwhile, the fly-eye lens is composed of the plurality of first unit shaped elements (or unit lenses) 50, each having a circular, symmetrical and isotropic structure and arranged on the surface 46. Therefore, this fly-eye lens can change the travel direction of the light, uniformly, in a plane extending along any given direction on the sheet surface of the optical sheet 40. Therefore, even though the arrangement direction of the first unit shaped elements 50 is set, without any consideration about the longitudinal direction da of each elongated light emitting tube of the light source 25 and/or about arrangement direction of such tubes of the light source 25 (that is orthogonal to the direction da), the travel direction of the light can be changed, uniformly as well as isotropically, in the plane along the arrangement direction of the tubes constituting together the light source 25. Thus, the in-plane unevenness of the brightness attributable to the arrangement construction of the light source 25 (i.e., the unevenness of the brightness that may be otherwise caused by the arrangement of the light emitting tubes constituting together the light source 25) can be securely mitigated. As such, the image of the light source 25 (or light image) that would be otherwise visually confirmed, due to such arrangement construction, can be made substantially inconspicuous. In the example shown in FIG. 2, when observed along the normal direction nd relative to the sheet surface of the optical sheet 40, the longitudinal direction da of each light emitting tube of the light source 25 is set to be parallel with one (i.e., d1) of the arrangement directions of the first unit shaped elements 50.

Further, in this embodiment, as shown in FIG. 3, each of the first unit shaped elements 50 has the shape corresponding to the part of the circle or a part of an ellipse projected toward the light outgoing side thereof, in a cross section parallel with the normal direction nd relative to the sheet surface of the optical sheet 40. That is to say, each of the first unit shaped elements 50 is provided as a unit lens. Preferably, in the case in which the cross-sectional shape of each of the first unit shaped elements 50 corresponds to the part of the ellipse, either one of the major axis or minor axis of such an elliptic cross-sectional shape extends in parallel with the normal direction nd (i.e., in the front direction) relative to the sheet surface of the optical sheet 40, from the viewpoint of positively enhancing the front brightness (front luminance).

More specifically, the arrangement pitch P1 (see FIG. 2) between the first unit shaped elements 50 on the one surface 46 of the main body 45 may be set within a range of from 10 µm to 40 µm. Further, the width W1 (see FIG. 2) of the bottom face of each of the first unit shaped elements 50 along the arrangement direction of the first unit shaped elements 50 on the one surface 46 of the main body 45 may be set within a range of from 10 µm to 200 µm. In addition, the height H1 (see FIG. 4) of projection of each of the first unit shaped elements 50 from the one surface 46 of the main body 45 along the normal direction nd relative to the sheet surface of the optical sheet 40 may be set within a range of from 5 µm to 100 µm. It is noted that the first unit shaped elements 50 have the same construction in the example shown in the drawings.

Next, the second unit shaped elements 55 will be described. In this example, the multiple second unit shaped elements 55 constitute together a linear-array prism unit. That is to say, in this embodiment, as shown in FIG. 2, the multiple second unit shaped elements 55 are arranged in a direction (or arrangement direction), without any space or interval, while each of the second unit shaped elements 55 extends in the other direction orthogonal to the arrangement direction. In the example shown in the drawings, when observed along the normal direction nd relative to the sheet surface of the optical sheet 40, each of the second unit shaped elements 55 extends in parallel with the one (d1) of the arrangement directions of the first unit shaped elements 50 as well as the longitudinal direction da of each light emitting tube of the light source 25.

Further, in this embodiment, as shown in FIGS. 3 and 4, when seen in a cross section that is parallel with the arrangement direction of the second unit shaped elements 55 as well as parallel with the normal direction nd relative to the sheet surface of the optical sheet 40 (this cross section will also be referred to as the "main cross section" with respect to the second unit shaped elements 55), each of the second unit shaped elements 55 has a triangular shape projected toward the light outgoing side. That is to say, each of the second unit shaped elements 55 is provided as the so-called unit prism. In particular, from the viewpoint of positively enhancing the front brightness (front luminance), it is preferred that each of the second unit shaped elements 55 has a cross-sectional shape of an isosceles triangle, with the vertex angle between the equal sides of this isosceles triangle projected toward the light outgoing side from the one surface 46 of the main body 45.

More specifically, the width W2 (see FIG. 4) of the bottom face of each of the second unit shaped elements 55 along the arrangement direction of the second unit shaped elements 55 on the one surface 46 of the main body 45 may be set within a range of from 1 µm to 200 µm. Further, the height H2 (see FIG. 4) of projection of each of the second unit shaped elements 55 from the one surface 46 of the main body 45 along the normal direction nd relative to the sheet surface of the optical sheet 40 may be set within a range of from 0.5 µm to 50 µm. Again, it is noted that the second unit shaped elements 55 have the same construction in the example shown in the drawings. Furthermore, in the case in which the cross section of each of the second unit shaped elements 55 is of the isosceles triangle shape, the angle θ (see FIG. 4) of the vertex angle between the equal sides of the isosceles triangle projected toward the light outgoing side is preferably set within a range of from 80° to 120°, more preferably 90°, from the viewpoint of positively enhancing the front brightness (front luminance).

It is noted that the term "triangular shape" or "triangle shape" is intended herein not only to mean a triangular shape in the strict sense of the words, but also to mean a substantially triangular shape involving a limit (bound) of precision of a manufacturing technique, an error associated with a molding process and the like, as well as a substantially triangular shape that can be expected to exhibit the optical functions similar or equivalent to those obtained by the genuine triangle shape. That is to say, a triangular shape including a rounded apex portion, a triangular shape with a head portion cut off (i.e., truncated triangular shape) and the like may also be included in the "triangular shape." Similarly, each of such terms, for example, "circle," "ellipse," "parallel," "orthogonal" and the like, as respectively used herein for expressing various specific geometrical shapes and/or conditions, is intended not only to include the geometrical shape and/or condition in the strict sense of the term, but also to include any similar geometrical shape and/or condition including geometrical shapes and/or conditions that can be expected to exhibit the optical functions substantially similar or equivalent to those obtained from one expressed by the true sense of the term.

Further, as shown in FIGS. 3 and 4, the height H2 of the projection of each of the second unit shaped elements 55 from the one surface 46 of the main body 45 along the normal direction nd relative to the sheet surface of the optical sheet 40 is lower than the height H1 of the projection of each of the first unit shaped elements 50 from the one surface 46 of the main body 45 along the normal direction nd relative to the sheet surface of the optical sheet 40. That is to say, on the one surface 46 of the main body 45, the second unit shaped elements 55 are divided into sections by the first unit shaped elements 50, while each divided section of the second unit shaped element 55 extends between two first unit shaped elements 50 located adjacent to each other along the longitudinal direction of the divided second unit shaped element 55. More specifically, in view of the optical function or effect that will be discussed below, it is preferred that the height H2 of the projection of each of the second unit shaped elements 55 is set within a range of from $1/10$ to $9/10$ relative to the height H1 of the projection of each of the first unit shaped elements 50.

In general, if the vertex of each linearly extending unit prism is in contact with another sheet member, while keeping the triangular cross-sectional shape thereof, the vertex of such a unit prism tends to be soon scraped or crushed away. As a result, the interference fringes will be more likely to be visually confirmed. However, in this embodiment, because the height H2 of the projection of each of the second unit shaped elements 55 composed of a linear prism is set to be lower than the height H1 of the projection of each of the first unit shaped elements 50 constituting the fly-eye lens, such inconvenience as will be experienced in the above case can be successfully avoided.

Next, one example of the method for producing the optical sheet 40 constructed as described above will be discussed.

Figure 5:
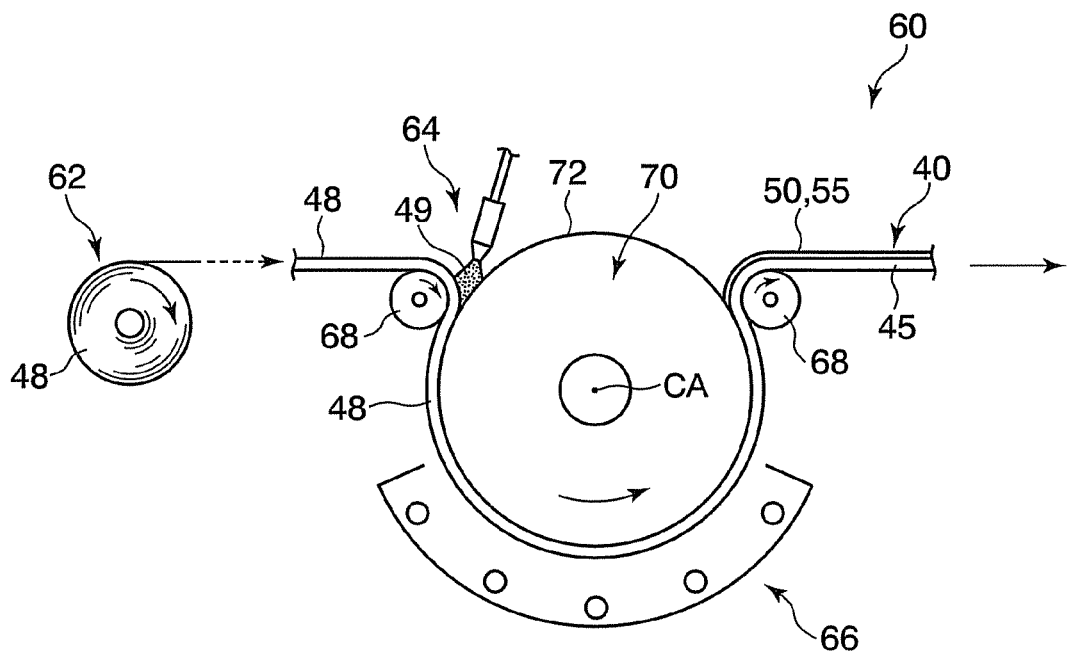
FIG. 5 is a diagram for schematically explaining the method for producing the optical sheet and a molding apparatus used for molding the optical sheet.

In the optical sheet 40 constructed as described above, it is not necessary to positively provide any optical effect to the light transmitted therethrough, at an interface between the main body 45 and the first unit shaped elements 50 as well as an interface between the main body 45 and the second unit shaped elements 55. Therefore, the optical sheet 40 may be formed from a single material, by the molding method using the molding machine 60 as shown in FIG. 5. As the material for producing the optical sheet 40, any suitable resin that is readily available and has excellent moldability as well as adequate transparency, such as a clear cross-linked material formed from a composition comprising a multi-functional urethane acrylate olygomer and a dipentaerythritol hexaacrylate monomer and having a refractive index of 1.57 as a cured material, can be used.

Figure 6:
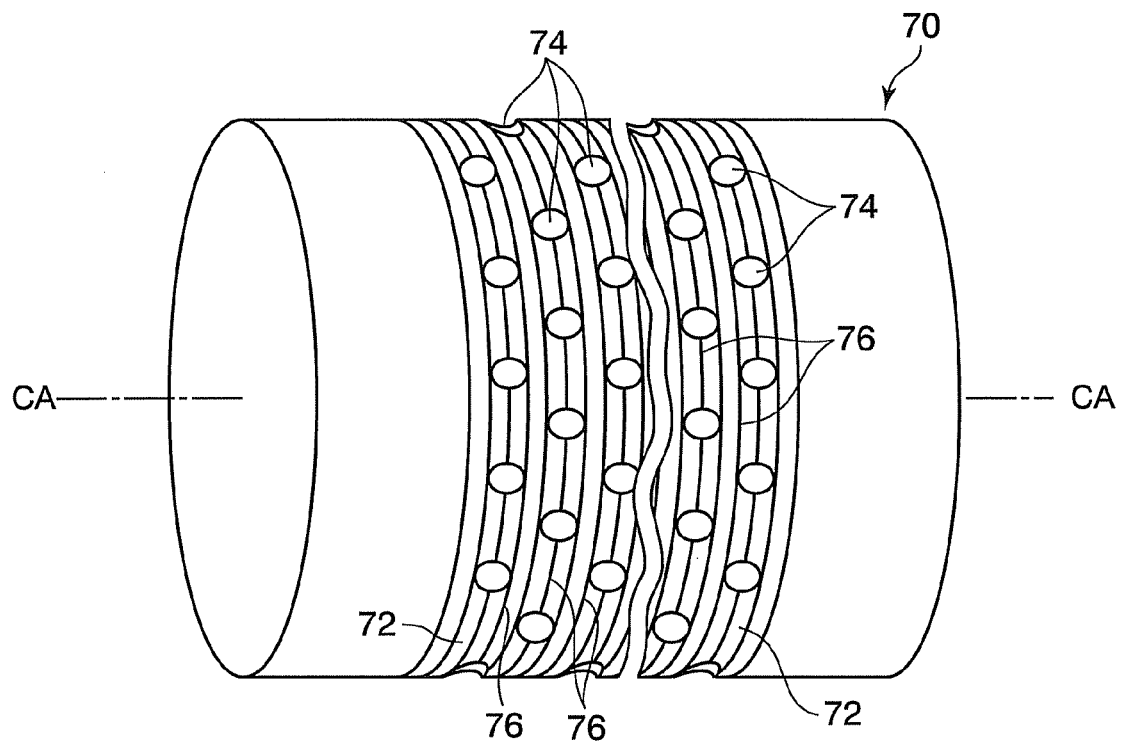
FIG. 6 is a perspective view schematically showing the mold incorporated in the molding machine shown in FIG. 5.

First, the molding apparatus 60 will be described. As shown in FIG. 5, the molding apparatus 60 includes the mold 70 having a substantially cylindrical contour. As shown in FIG. 6, a cylindrical outer circumferential face (or side face) of this mold 70 includes a cylindrical molding surface (or concavo-convex surface) 72. Further, this cylindrical mold 70 has a central axis CA extending through the center of the cylindrical outer circumferential face thereof. That is to say, this central axis CA extends through the center of a cross section of the cylindrical body of the mold 70. The mold 70 can serve as a roll-type mold adapted for molding the optical sheet 40, as an article to be molded, while rotating about the central axis CA thereof (see FIG. 5).

As shown in FIG. 6, in the molding surface 72, concave or recessed portions 74, corresponding to the aforementioned first unit shaped elements 55 of the optical sheet 40, and grooves 76, corresponding to the second unit shaped elements 55, are formed. Each groove 76 extends along the outer circumferential face of the mold 70, circularly or spirally, about the central axis CA of the molding surface 72. In either case, each groove 76 extends in a substantially vertical direction relative to the central axis CA of the molding surface 72 (e.g., the angle at which the groove 76 extends relative to the central axis is approximately $90°\pm1\times10^{-2°}$). Each recessed portion 74 can be formed, such as by etching utilizing photolithography or the like, in a desired position of an outer circumferential face of a proper cylindrical base material. Then, in the circumferential face of the cylindrical base material, in which the recessed portions 74 have been formed, each groove 76 is formed, such as by cutting using a cutting byte or the like, into a form crossing each recessed portion 74.

As shown in FIG. 5, the molding apparatus 60 further includes a molding base-material supply unit 62 adapted for supplying a belt-like sheet material (or molding base-material sheet) 48, a material supply unit 64 adapted for supplying a material 49 having proper fluidity into a space between the sheet material 48 supplied from the molding base-material supply unit 62 and the molding surface 72 of the mold 70, and a curing unit 66 adapted for curing the material 49 fed between the sheet material 48 and the concavo-convex surface 72 of the mold 70. It is noted that the curing unit 66 may be optionally configured, depending on the curing properties of the material 49 to be cured.

Now, the method for producing the optical sheet 40 by using such a molding apparatus 60 as described above will be discussed. First, the sheet material 48 formed from, for example, a resin having proper transparency, is supplied from the molding base-material supply unit 62. Subsequently, the sheet material 48 supplied from the molding base-material supply unit 62 is fed into the mold 70 and then held by the mold 70 and a pair of rollers 68 such that the sheet material 48 is kept in as state opposite to the concavo-convex surface 72 of the mold 70.

During the supply of the sheet material 48 into the mold 70, as shown in FIG. 5, the material 49 having the proper fluidity is supplied from the material supply unit 64 to the space between the sheet material 48 and the molding surface 72 of the mold 70. As used herein, the term "having the fluidity" means that the material 49 supplied to the molding surface 72 of the mold 70 has such proper fluidity that can allow the material 49 to adequately flow into the recessed portions 74 and grooves 76 formed in the molding surface 72. As the material 49 to be supplied, various known materials suitable for this molding method can be mentioned. However, in the examples described below, an ionizing-radiation-curing resin is supplied from the material supply unit 64. As the ionizing-radiation-curing resin, for example, the UV-curing resin that can be cured when irradiated with ultraviolet (UV) rays, an EB-curing resin that can be cured when irradiated with an electron beam (or beams) (EB), and the like can be mentioned.

Figure 7:
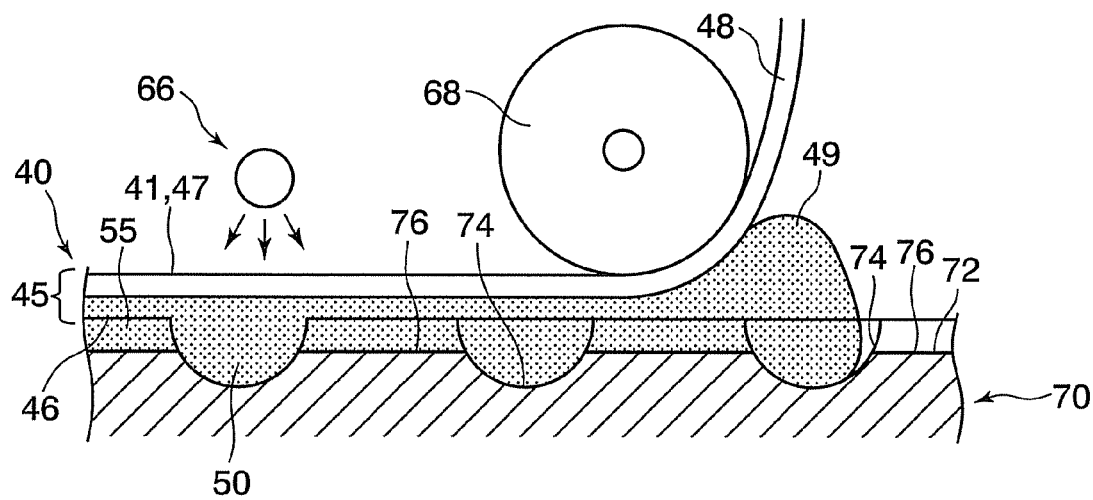
FIG. 7 is a cross section for illustrating a method for molding the optical sheet.

As described above, each groove 76 formed in the molding surface 72 extends along the molding surface 72 in the substantially vertical direction relative to the central axis CA of the mold 70. Therefore, as shown in FIG. 7, the material 49 supplied from the material supply unit 64 can be filled over the mold 70, while being flowed along the longitudinal direction (i.e., the one direction corresponding to a lateral direction in the sheet of FIG. 7) of each of the second unit shaped elements 55 of the optical sheet 40 that will be formed by the mold 70. That is to say, the material 49 is supplied along each groove 76 provided for forming each of the second unit shaped elements 55. In fact, from the experiments conducted by the inventors, it was found that this molding method can effectively avoid the formation or incorporation of unwanted air bubbles in each of the first unit shaped elements 50 that will constitute the fly-eye lens of the optical sheet 40, as well as successfully prevent unnecessary recessed defects or holes from being formed in the surface of the first unit shaped element 50.

Although the mechanism that can effectively prevent the formation of such air bubbles and/or recessed defects in each unit lens constituting the fly-eye lens is still being elucidated, one mechanism that can be thought as one of the main factors of this effect will be discussed below.

That is to say, as described above, each groove 76 extends along the molding surface 72, while passing through some corresponding recessed portions 74 provided for forming the first unit shaped elements 50. Therefore, when the material 49 is flowed into each recessed portion 74 of the mold 70, a gas (typically air) that has been so far present in the recessed portion 74 will be readily pushed out from the recessed portion 74 into the groove 76, with the supply of the material 49. That is to say, such a gas or air will tend to be pushed out and removed away from the inside of each recessed portion 74 of the mold 70, via a certain path, with the supply and filling of the material 49 into the recessed portion 74. Thus, it can be expected that the aforementioned molding method can effectively prevent the air bubbles from being incorporated or taken in the material 49 filled in the molding surface 72. However, it is important to note that this invention is not limited to the mechanism as assumed above.

Thereafter, the molding sheet material 48 is passed through a position opposite to the curing unit 66, with the space between the sheet material 48 and the molding surface 72 of the mold 70 filled with the ionizing-radiation-curing resin. At this time, ionizing radiation suitable for the curing properties of the ionizing-radiation-curing resin 49 is radiated from the curing unit 66. As such, the ionizing-radiation-curing resin 49 can be irradiated with the ionizing radiation transmitted through the sheet material 48. As a result, the ionizing-radiation-curing resin 49 filled in the recessed portions 74 and grooves 76 of the molding surface 72 can be cured. In this way, the first unit shaped elements 50 and second unit shaped elements 55 can be formed on the sheet material 48, from the so-cured ionizing-radiation-curing resin 49. However, this invention is not limited to this molding method. For instance, any other suitable extrusion method, transfer molding method or the like can also be used.

From the further experiments conducted by the inventors, it was found that it is effective for enhancing the effect of removing or discharging the gas from the inside of the mold 70 to set the height H2 of the projection of each of the second unit shaped elements 55, at the ratio of $1/10$ or high, as compared with the height H1 of the projection of each of the first unit shaped elements 50.

Thereafter, as shown in FIG. 5, the sheet material 48 is released or separated from the mold 70, while the unit shaped elements 50, 55, respectively molded in the recessed portions 74 and grooves 76 of the molding surface 72, are pulled away from the mold 70, together with the sheet material 48. In this way, the aforementioned optical sheet 40 can be obtained.

During the unmolding (separation) of the molded unit shaped elements 50, 55 (or cured material 49) from the mold 70, the unit shaped elements 50, 55 (or cured material 49) are gradually pulled away from the mold 70, along the longitudinal direction (i.e., the one direction) of each of the molded second unit shaped elements 55. As described above, each of the second unit shaped elements 55 is molded integrally with some corresponding first unit shaped elements 50 and extends in its longitudinally direction. Accordingly, this method can allow the second unit shaped elements 55 to be smoothly unmolded (separated or released) from the mold, together with the first unit shaped elements 50, thereby successfully avoiding unwanted occurrence of cracks in the molded second unit shaped elements 55 and first unit shaped elements 50, as well as effectively preventing such molded second unit shaped elements 55 and first unit shaped elements 50 from being peeled off from the sheet material 48.

In the example shown in FIG. 7, the sheet material 48 is not directly contacted with the surface of the mold 70. Therefore, the main body 45 of the optical sheet 40 formed as shown in FIG. 7 will be composed of the sheet material 48 and the material 49 cured into a sheet-like form. Therefore, this method can successfully prevent the molded second unit shaped elements 55 and first unit shaped elements 50 from being partly left in the mold 70 upon the unmolding (release or separation) of these elements from the mold.

As described above, during the one rotation of the roll-type mold 70 about the central axis CA, the step of supplying the fluidic material 49 into the mold 70, the step of curing the material supplied in the mold 70 in this mold 70, and the step of unmolding (releasing) the cured material 49 from the mold 70 are successively performed on the molding surface 72 of the mold 70, thus forming the optical sheet 40. In this case, since the incorporation of the unwanted air bubbles in the obtained optical sheet 40 and/or formation of the unnecessary recessed defects or holes in the surface of the optical sheet 40 can be successfully controlled, the obtained optical sheet 40 can adequately exhibit excellent optical properties as desired. Further, because the effect of removing or discharging the air bubbles from the inside of the mold 70 is positively enhanced, the optical sheet 40 including the fly-eye lens can be produced more rapidly with higher efficiency, as compared with a usual fly-eye lens sheet. This can significantly save the cost for producing an optical sheet 40 including the fly-eye lens. It is noted that the cost for preparing the mold 70 used for molding the optical sheet 40 is not so increased, as compared with the cost for preparing the mold for molding the usual fly-eye lens sheet.

Next, the operation or function of each of the optical sheet 40, surface light source device 20 and transmission-type display device 10, as described above, will be discussed.

First of all, the general operation or function of the transmission-type display device 10 and surface light source device 20 will be described.

First, the light emitted from the light source 25 travels toward the observer, directly, or otherwise after reflected by the reflector 28. Thereafter, the light is isotropically diffused by the light diffusing sheet 38, and then incident on the optical sheet 40. In the optical sheet 40, the light is collected (condensed), such that the angle formed between the travel direction of the light and the front direction nd (i.e., the normal direction relative to the sheet surface of the optical sheet 40) will be lessened so as to approach substantially 0°. Additionally, in the optical sheet 40, the light is diffused, such that the angular distribution of the brightness can be smoothly changed, as well as the in-plane distribution of the brightness can be uniformed. The operation or function of the optical sheet 40 will be detailed later.

Thereafter, the light outgoing from the optical sheet 40 is transmitted through the light collecting sheet (light condensing sheet) 30 and polarized-light separating film 35, in order to further enhance the front brightness. The transmission-type display unit 15 can transmit therethrough the light incident thereon from the surface light source device 20, selectively, for each pixel or picture element. In this way, the observer can observe each image displayed on the transmission-type display device 10.

Next, the operation or function of the optical sheet 40 will be described in more detail.

First of all, the operation or function of the first unit shaped elements (unit lenses) 50 constituting together the fly-eye lens will be discussed. As shown in FIGS. 3 and 4, the light L31, L41 to L44, each outgoing from one first unit shaped element 50 of the optical sheet 40, is refracted at an light outgoing side surface (or lens surface) of the first unit shaped element (or unit lens) 50. With this refraction, the travel direction (or output direction) of each light L31, L41 to L44 that has traveled obliquely relative to the front direction nd is changed, such that the angle of the travel direction relative to the normal direction nd to the sheet surface of the optical sheet 40 can be substantially lessened, as compared with the travel direction of the light before or upon being incident on the optical sheet 40 (see the light L31 shown in FIG. 3 and/or light L41 shown in FIG. 4). With this operation or function, as described above, each of the first unit shaped elements 50 can serve to converge the travel direction of the light transmitted therethrough toward the front direction nd. That is to say, each of the first unit shaped elements 50 can have a light collecting (condensing) effect on the light transmitted therethrough.

In this case, the light which are emitted from the light source 25 and then is directly incident on a region of the optical sheet 40 relatively far away from the light source 25, i.e., the region of the optical sheet 40 located in a position opposite to an intermediate point of any given two adjacent light emitting units (or tubes) of the light sources 25, travel toward and through the optical sheet 40, rather obliquely (i.e., at a relatively large incident angle), relative to the front direction nd (e.g., see the light L31 in FIG. 3). However, the aforementioned light collecting effect of each of the first unit shaped elements 50 will be exerted, more effectively, on such light travelling rather obliquely relative to the front direction nd. Thus, the brightness (luminance) can be adequately enhanced, even in such a region located relatively far away from the light source, where the brightness (luminance) would otherwise tend to be conspicuously degraded.

Meanwhile, as shown in FIG. 3, in another region located in a position just above (any one light emitting unit or tube of) the light source 25 of the optical sheet 40, a relatively great amount of the light (e.g., the light L32 in FIG. 3) will be generally incident on the optical sheet 40, at a substantially small incident angle, although depending on the degree of diffusion operation exerted on the light during the travel between the light source 25 and the optical sheet 40. In this case, for a part of such light L32, total reflection will be repeated at the light outgoing side surface (or lens surface) of each of the first unit shaped elements 50 of interest, and then the travel direction of such a part of light L32 will be eventually changed toward the light incident side (or light source side). This operation can successfully prevent the brightness (luminance) from being unduly increased in the position just above each light emitting unit or tube of the light source 25.

Therefore, this configuration, as described and shown above, can successfully control the difference in the optical effect that is mainly provided to the transmitted light from each of the first unit shaped elements 50, corresponding to the difference in the distance from the light source 25 (more specifically, the distance from each light emitting unit or tube of interest of the light source 25). Therefore, the unevenness of the brightness attributable to the arrangement of the light emitting units (or tubes) of the light source 25 can be effectively mitigated, as such the image of the light source (or light image) can be made substantially inconspicuous. As described above, the first unit shaped elements 50 are arranged in the different two directions on the one surface 46 of the main body 45, while constituting together the fly-eye lens. That is to say, such first unit shaped elements 50 are arranged, two-dimensionally, on the one surface 46 of the main body 45. Thus, the fly-eye lens composed of such first unit shaped elements 50 can serve to adequately change the travel direction of the light, in the plane extending in any given direction on the sheet surface of the optical sheet 40. Therefore, even though the optical sheet 40 is located on the light source 25, without any consideration on the arrangement direction of the light source 25, an adequate light collecting (condensing) function as well as a desired light diffusing function can be exhibited, due to such arrangement of the first unit shaped elements 50 as described above.

Next, the operation or function of the second unit shaped elements (or unit prisms) 55 constituting together the linear-array prism unit will be described. As shown in FIGS. 3 and 4, the light L36, L45 to L49 outgoing from each second unit element 55 of the optical sheet 40 is also refracted at the light outgoing side surface (or prism surface) of the second unit shaped element (or unit prism) 55. With this refraction, the travel direction of the light L36, L45 to L48 that has traveled obliquely relative to the front direction nd is changed, such that the angle of the travel direction relative to the normal direction nd to the sheet surface of the optical sheet 40 can be substantially lessened, as compared with the travel direction of the light before or upon being incident on the optical sheet 40. With this operation or function, as described above, each of the second unit shaped elements 55 can serve to converge the travel direction of the light transmitted therethrough toward the front direction nd. That is to say, each of the second unit shaped elements 55 can have the light collecting (condensing) effect on the light transmitted therethrough.

Meanwhile, as in the case of the first unit shaped elements 50, the light 37 travelling in a direction that is not so oblique to the front direction nd, as shown in FIG. 3, tends to undergo the repeated total reflection at the light outgoing side surface (or prism surface) of each of the second unit shaped elements 55 of interest. Thus, the travel direction of such light will be eventually changed toward the light incident side (or light source side).

As described above, in this embodiment, each of the second unit shaped elements 55 is arranged in parallel with the arrangement direction of each light emitting unit or tube of the light source 25. Thus, the light, which is incident on a region including a position, as a center of the region, opposite to the intermediate point of any given two adjacent light emitting units of the light sources 25 at relatively large incident angle, is refracted on the light outgoing side surface (prism surface) of each of the second unit shaped elements 55 such that the angle formed between the travel direction of the refracted light and the front direction nd will be lessened so as to approach substantially 0°. This can successfully prevent the brightness from being unduly degraded, even in the region of the optical sheet 40 including the position, as a center of the region, opposite to the intermediate point of any given two adjacent light emitting units of the light sources 25.

Meanwhile, as shown in FIG. 3, in another region located in the position just above (any one light emitting unit or tube of) the light source 25 of the optical sheet 40, a relatively great amount of the light (e.g., L37 in FIG. 3) will be generally incident on the optical sheet 40 at a substantially small input angle. In this case, however, each of the second unit shaped elements 55 of interest can return such light toward the light source, due to the repeated total reflection provided to the light at the light outgoing side surface (or prism surface) of this second unit shaped element 55 (e.g., see the light L37 in FIG. 3). This operation can successfully prevent the brightness from being unduly increased in the position of the optical sheet 40 located just above each light emitting unit or tube of the light source 25.

Therefore, in this embodiment, the second unit shaped elements 55 can also serve to effectively mitigate the unevenness of the brightness attributable to the arrangement of the light emitting units (or tubes) of the light source 25, thereby to render the image of the light source (or light image) substantially inconspicuous.

By the way, as shown in FIG. 4, in the case in which the light travels obliquely relative to the normal direction nd and toward each of the second unit shaped elements 55 of interest having the triangular cross section, such light often travels through the optical sheet 40 and incident on one light outgoing side surface (one prism surface) 56a extending in a direction reverse to the travel direction of such light, e.g., L45 to L48, with respect to the normal direction nd. In this case, if the incident angle of each light L45 to L48 incident on one second unit shaped element 55 of interest, relative to the front direction nd, is constant, the outgoing angle of each light L45 to L48 outgoing from the second unit shaped element 55, relative to the front direction nd, will also be constant, irrespectively of the incident point, of the light L45 to L48, on the light outgoing side surface (or one prism surface) 56a. That is to say, the travel direction of each light outgoing from the second unit shaped elements 55 is determined, generally depending on the structural and optical properties of each of the second unit shaped elements 55 of interest (e.g., the shape, refractive index and the like).

It is noted that the incident angle of the travel direction of each light L41 to L49 shown in FIG. 4 is depicted to be substantially the same relative to the front direction nd.

However, unlike such optical properties of the second unit shaped elements 55, in the case of the first unit shaped elements 50, each having the circular or elliptic cross section, as shown in FIG. 4, even if the traveling angle, of each light L41 to L44 traveling toward each of the first unit shaped elements 50 of interest, relative to the front direction nd, is constant, the incident angle of such light L41 to L44 outgoing from the first unit shaped element 50, relative to the front direction nd, will vary with the incident point, of each light L41 to L44, on the light outgoing side surface (or lens surface) of the first unit shaped element 50. Accordingly, the travel direction of each light outgoing from the first unit shaped elements 50 is greatly susceptible not only to the structural and optical properties of each of the first unit shaped elements 50 of interest (e.g., the shape, refractive index and the like) but also to the incident point of the light on the first unit shaped element 50.

As shown in the drawings, the pitch or interval in the arrangement of the first unit shaped elements 50 and second unit shaped elements 55 is quite narrow, as compared with the interval in the arrangement of the light emitting unit or tubes of the light source 25. Accordingly, the traveling angle, of the light which is emitted form the light source 25 and travels toward the unit shaped elements 50 or 55, can be considered to be substantially the same. Thus, each of the second unit shaped elements (or unit prism) 55 can serve to collect (condense) the angle of the light travel direction relative to the front direction nd into a relatively narrow angular range centered on the front direction nd. That is to say, with an adequately suitable design for the structural and optical properties, each of the second unit shaped elements 55 can be provided to exhibit a highly excellent light condensing function.

Meanwhile, each of the first unit shaped elements (or unit lens) 50 can serve to collect (condense) the angle of the light travel direction relative to the front direction nd into a relatively wide angular range as well as to smoothly change the brightness distribution over the angular range into which this element 50 collects the light travel direction. That is to say, each of the second unit shaped elements (or unit prism) 55 can exhibit a more positive light condensing function, as compared with each of the first unit shaped elements (or unit lens) 50, while the first unit shaped element (or unit lens) 50 can exhibit a more augmented light diffusing function, as compared with the second unit shaped element (or unit prism) 55.

Accordingly, with the provision of the optical sheet 40 including such first unit shaped elements 50 and second unit shaped elements 55, the light transmitted through the sheet 40 can be effectively condensed, thereby substantially enhancing the front brightness (front luminance), while such transmitted light can be adequately diffused, thereby to significantly uniform the in-plane distribution of the brightness (luminance), with the angular distribution of the brightness (luminance) smoothly changed. Therefore, according to the surface light source device 20 and transmission-type display device 10, incorporating the optical sheet 40 thereinto, the front brightness can be substantially enhanced by efficiently and effectively utilizing the light emitted from the light source, as well as the angular range relative to the front direction nd, in which the observer can visually confirm the image on the display (i.e., the angle of visibility) can be significantly widened. That is to say, highly ideal energy saving can be achieved. Besides, the occurrence of the unwanted unevenness of the brightness attributable to the construction of the light source 25 (more specifically, the unevenness of the brightness that may be otherwise caused by the arrangement of the light emitting tubes constituting together the light source 25) can be successfully avoided. Thus, highly desired display of the image with excellent picture quality can be achieved.

Especially, as is found from the intensive experiments conducted by the inventors and is also proved by experimental results of several Examples as will be described later by way of example, the enhancement of the front brightness as well as the suppression of in-plane variation or unevenness of the brightness (for making the image of the light source more inconspicuous or hiding the light source image) can be achieved, at a time, by appropriately controlling the distance between the two adjacent first unit shaped elements 50 as well as suitably adjusting the arrangement pitch P2 of the second unit shaped elements 55. More specifically, it is preferred that an average Sa of the least interval between the first unit shaped elements 50 is equal to or greater than the arrangement pitch P2 of the second unit shaped elements 55, in the direction (i.e., the arrangement direction of the second units-shape elements 55) orthogonal to the one direction (i.e., the longitudinal direction of each of the second unit shaped elements 55) on the sheet surface of the main body 45. More preferably, the average Sa of the least interval between the first unit shaped elements 50 is equal to or greater than twice the arrangement pitch P2 of the second unit shaped elements 55.

As used herein, "the average Sa of the least space (interval)" means the average of the distance (length of the space), along the sheet surface of the main body 45, between one of the first unit shaped elements 50 that is optionally selected and the other one of the first unit shaped elements 50 positioned nearest to the one first unit shaped element 50 along the sheet surface of the main body 45. In the aforementioned embodiment, the first unit shaped elements 50, each having the same width W1 (in this example shown in the drawings, the same diameter W1 on the one surface 46 of the main body 45), are dispersed on the one surface 46 of the main body 45, with the same arrangement pitch P1. Thus, the average Sa of the least space can be obtained by subtracting the width W1 from the arrangement pitch P1 (i.e., Sa=P1−W1) (see FIG. 2). Meanwhile, in the case in which the first unit shaped elements 50 are arranged in a random arrangement (or in a irregular arrangement) on the one surface 46 of the main body 45, the average Sa of the least space can be obtained by measuring the distance (length of the space formed) between the optionally selected one of the first unit shaped elements 50 and another first unit shaped element 50 positioned nearest to the selected one first unit shaped element 50 along the sheet surface of the main body 45, at multiple measurement points, for example, 20 to 100 points, and then calculating the average of the measured values.

In this embodiment, unlike the first unit shaped elements 50, the second unit shaped elements 55 are arranged, without any gap or interval provided therebetween. Therefore, the arrangement pitch P2 of the second unit shaped elements 55 in the direction orthogonal to the one direction on the sheet surface of the main body 45 corresponds to the width W2 of each of the second unit shaped elements 55.

The mechanism that can positively enhance the front brightness as well as can reduce or suppress the in-plane variation of the brightness, in the case in which the average Sa of the least space (interval) between the first unit shaped elements 50 is equal to or greater than the arrangement pitch P2 of the second unit shaped elements 55, is now still being elucidated. However, from the results of the experiment conducted by the inventors, it can be estimated that each of the second unit shaped elements 55 can adequately exhibit its own optical function, while the optical function of each of the first unit shaped elements 50 is not substantially affected by the second unit shaped elements 55 located between the first unit shaped elements 50. Further, in the case of satisfying the aforementioned condition, at least one second unit shaped element 55 is present between the two adjacent unit shaped elements 50 located along the arrangement direction of the second unit shaped elements 55 (i.e., the direction orthogonal to the one direction (see FIG. 3)). In other words, as apparently shown in FIG. 2, such a one second unit shaped element 55 extending without being overlapped with any one of the first unit shaped elements 50 is present (i.e., an light outgoing side surface corresponding to such a one second unit shaped element 55 can be ensured), between the two adjacent first unit shaped elements 50 located along the direction orthogonal to the one direction. Thus, the second unit shaped elements 55 are arranged between the first unit shaped elements 50, such that the optical function of these second unit shaped elements 55 can be adequately exhibited therefrom. The above estimation is in line with the feature in the construction of the optical sheet.

However, if the average Sa of the least interval between the first unit shaped elements 50 is excessively increased, the optical function of the fly-eye lens composed of such first unit shaped elements 50 will be unduly degraded. Accordingly, with further consideration on the size of each unit shaped element constituting together the fly-eye lens usually used as well as on the size of each linear prism or the like, the average Sa of the least space (interval) between the first unit shaped elements 50 is preferably equal to or less than 10 times the arrangement pitch P2 of the second unit shaped elements 55.

By the way, as described above, in the case in which the light travels, obliquely to the normal direction nd, toward each of the second unit shaped elements 55 having the triangular cross section, most of such light tends to travels through the optical sheet 40 and is incident on the one light outgoing side surface (i.e., the one prism surface) 56*a* extending in the direction reverse to the travel direction of such light, e.g., L45 to L48, with respect to the normal direction nd. However, as shown in FIG. 4, a part of the light (e.g., L49) travels toward each of the second unit shaped elements 55 and is incident on the other light outgoing side surface (i.e., the other prism surface) 56*b* extending in substantially the same direction as the travel direction of the light L49, with respect to the normal direction nd. In this case, most of such light that is incident on the other light outgoing side surface 56*b* will undergo the total reflection on this light outgoing side surface 56*b*. Then, a part of such light (e.g., the light L49 in FIG. 4) sometimes outgoes from the second unit shaped element (or unit prism) 55 of interest, at an extremely great output angle, after subjected to the total reflection. Such light is the so-called "side lobe" light that cannot be effectively used in the transmission-type display device 10, while having a tendency to substantially degrade the picture quality of the image.

However, in this embodiment, the first unit shaped elements 50 are provided, in addition to the second unit shaped elements 55, on the one surface 46 of the main body 45. Besides, as shown in FIG. 4, the height H1 of the projection of each of the first unit shaped elements 50 from the main body 45 is set higher than the height H2 of the projection of each of the second unit shaped elements 55 from the main body 45. Therefore, the light L49, once having exited, at the extremely great output angle, from the second unit shaped element (or unit prism) 55, can be further incident into the first unit shaped element 50. As a result, due to the refraction at the light outgoing side surface of this first unit shaped element 50, the travel direction of such light L49 can be changed to substantially lessen the outgoing angle of the light relative to the front direction nd.

From the further experiments conducted by the inventors, it was found that it is highly effective, for substantially suppressing or reducing the side lobe, to set the height H2 of the projection of each of the second unit shaped elements 55, at the ratio of 9/10 or less, more preferably 2/3 or less, as compared with the height H1 of the projection of each of the first unit shaped elements 50.

According to the embodiment as described above, the second unit shaped elements 55 are provided to the space or interval between the two adjacent first unit shaped elements 50 on the one surface 46 of the main body 45. Meanwhile, in most of the prior art fly-eye lens sheets, because of the limitations on the production, some space or interval has been provided, inevitably, between the two adjacent first unit shaped elements 50, and thus each region corresponding to such a space or interval has been formed into a flat face. Therefore, the light emitted from the light source and then incident on such a flat face region will directly outgo from such a prior art fly-eye lens sheet, without undergoing any refraction and/or reflection. Due to the presence of such outgoing light, the image of the light source 25 tends to be visually confirmed. However, in the case of the optical sheet 40 of this invention, the light that travels toward each region between the first unit shaped elements 50 on the one surface 46 of the main body 45 can be appropriately diffused and changed in the travel direction thereof, due to the second unit shaped elements 55 having adequate light diffusion function and light collecting (condensing) function. That is to say, the optical sheet 40 prevent the light from directly outgoing, without undergoing any change of the travel direction thereof (i.e., this optical sheet 40 can substantially eliminate the light directly passing therethrough), from each space between the first unit shaped elements 50 on the one surface 46 of the main body 45. Therefore, as compared with the prior art fly-eye lens sheet, the optical sheet 40 of this invention can substantially improve at least one of the light collecting (condensing) function and light diffusing function. Thus, the optical properties, e.g., the front brightness (front luminance) and/or effective range of the angle of visibility, of the surface light source device 20 (or transmission-type display device 10) can be significantly improved. In addition, the number of the optical sheets 40 incorporated in the surface light source device 20 can be decreased, thereby effectively reducing the production cost for the surface light source device 20 as well as facilitating the production of the device 20.

Further, by molding the optical sheet 40, with the longitudinal direction (i.e., the one direction) of each of the second unit shaped elements 55 matched with the operational direction of the molding machine (i.e., the rotation direction of the mold), the unwanted incorporation of the air bubbles into the optical sheet 40 and the formation of holes in the surface of the optical sheets 40 can be positively avoided.

Further, in the embodiment described above, the first unit shaped elements 50 and second unit shaped elements 55 are provided, as the elements having the optical properties different from each other. Thus, with a suitable design for the first unit shaped elements 50 and second unit shaped elements 55, as well as appropriate control of the proportion between the area that the first unit shaped elements 50 are provided and the area that the second unit shaped elements 55 are provided, on the one surface 46 of the main body 45, and the like, highly desired optical properties can be provided to the optical sheet 40.

Moreover, in accordance with the above embodiment, the whole area of the one surface 46 of the main body 45 is covered with the first unit shaped elements 50 and/or second unit shaped elements 55. Therefore, as described above, this configuration can substantially eliminate the light directly passing through the optical sheet 40 without changing the traveling direction, thereby further improving the optical properties of the surface light source device 20 (or transmission-type display device 10).

In addition, according to this embodiment, the first unit shaped elements 50 are arranged on the one surface 46 of the main body 45, while being slightly spaced away from one another, as compared with the two-dimensional closed-packed structure. With this configuration, the first unit shaped elements 50 can be arranged, considerably closely to one another, on the one surface 46 of the main body 45. Therefore, this considerably close arrangement of the first unit shaped elements 50 can adequately provide the optical effect thereof to the light transmitted through the optical sheet 40. Further, with such a substantially closed-packed structure of the first unit shaped elements 50, the area in which the first unit shaped elements 50 are not arranged on the one surface 46 of the main body 46 can be lessened to the minimum as needed. This can prevent the light from directly passing through the optical sheet 40 without changing the traveling direction more effectively.

It is important to note that various changes or modifications can be made to the above embodiment. Hereinafter, one variation of the embodiment will be described.

For instance, in the above embodiment, each of the first unit shaped elements 50 has been described as one having the cross section of the shape corresponding to the part of the circle or part of the ellipse (i.e., part of a sphere or spheroid in the three-dimensional expression). However, the shape of each of the first unit shaped elements 50 is not limited to this example. For instance, each of the first unit shaped elements 50 may have a triangular cross section (i.e., conical shape in the three-dimensional expression). Further, each of the first unit shaped elements 50 may optionally have a proper three-dimensional shape, corresponding to any other suitable cross-sectional shape than those described above, such as a hyperbola, a parabola, a cycloid, a cardioid, a normal distribution curve, a sine curve, a hyperbolic sine curve, an elliptic function curve (such as an sn function, a cn function and the like), a Bessel function curve, a Rankin's oval or the like, depending on any desired optical properties (e.g., the light condensing function, light diffusing function, aberration, retroreflective property and the like). Further, in the above embodiment, one example, in which the bottom face (the face connected with the main body 45) of each of the first unit shaped elements 50 is the circular shape (see FIG. 2), has been described. That is to say, in this example, the three-dimensional shape of this element 50 corresponds to a body of revolution having a rotation axis extending parallel with the normal line nd relative to the sheet surface of the optical sheet 40. However, the shape of the bottom face of each of the first unit shaped elements 50 is not limited to this example. For instance, the bottom face of this unit shaped element 50 may have an elliptic shape or any other suitable polygonal shape, such as the triangular shape, tetragonal shape, heptagonal shape, hexagonal shape, octagonal shape or the like. Furthermore, in the above embodiment, the first unit shaped elements 50 of the optical sheet 40 have been described as those having the same configuration. However, the configuration of each of the first unit shaped elements 50 is not limited to this example. For instance, various kinds of first unit shaped elements 50, different from one another, in at least one of the height, cross-sectional shape, bottom face shape and the like, may be included in the optical sheet 40.

In the above embodiment, one example, in which the first unit shaped elements 50 constituting together the fly-eye lens are arranged, with the constant pitch, along the two directions defining the 60° angle therebetween, on the one surface 46 of the main body 45, has been described. However, the arrangement of the first unit shaped elements 50 is not limited to this example. For instance, these first unit shaped elements 50 may be arranged, with the constant pitch, along two directions orthogonal to each other (i.e., the elements 50 may be arranged into a square lattice form), on the one surface 46 of the main body 45. Alternatively, the first unit shaped elements 50 may be arranged, in a random manner (at random), on the one surface 46 of the main body 45. As one example of arranging the first unit shaped elements 50, in a random manner, on the one surface 46 of the main body 45, the following one approach can be mentioned. First, for instance, in the same manner as described in the above embodiment, a certain regular arrangement position is provisionally determined, as a reference, for multiple first unit shaped elements, such that the distance or interval between the two adjacent first unit shaped elements can be substantially constant. Then, the first unit shaped elements are shifted with a various length, set for each of the first unit shaped elements to a random value, e.g., shorter than a half of the aforementioned constant interval, and newly positioned on the one surface 46 of the main body 45, while any of the two adjacent first unit shaped elements are not overlapped with each other. Such first unit shaped elements 50 arranged, in a random manner, under certain control, on the one surface 46 of the main body 45, can render the so-called moiré (or interference fringes) attributable to a specific arrangement of the first unit shaped elements 50 more inconspicuous, while adequately preventing the occurrence of the in-plane variation of the brightness (luminance) that may be caused by excessively uneven arrangement of the first unit shaped elements 50 on the main body 45.

Figure 8:
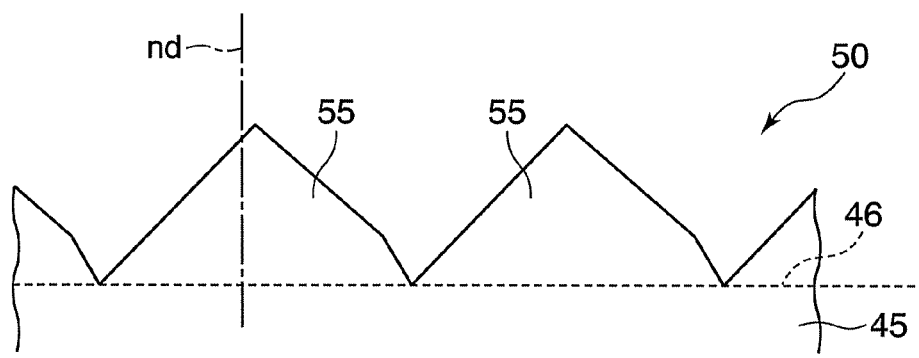
FIG. 8 is a cross section for showing one variation of the second unit shaped elements included in the optical sheet.

Further, in the above embodiment, one example, in which each of the second unit shaped elements 55 has the isosceles triangular cross section shape, has been described. However, the cross section of each of the second unit shaped elements 55 is not limited to the isosceles triangular shape. For instance, the cross section of this second unit shaped element 55 may have a properly modified or altered triangular shape specially designed for providing particular and/or desired optical properties to each element 55. More specifically, for appropriately controlling the optical properties, each of the second unit shaped elements 55 may have any suitable triangular or triangle-like cross-sectional shape, such as the triangle having one or more bent sides as shown in FIG. 8, triangle having one or more curved sides (i.e., the so-called fan shape), triangle having a curved or rounded vertex, or triangle having one or more sides, each including a small concavo-convex portion (or portions). Alternatively or additionally, each of the second unit shaped elements 55 may have another cross-sectional shape than the triangular cross sections as described above, e.g., various polygonal shapes, such as tetragonal shapes including trapezoids, pentagonal shapes, hexagonal shapes or the like. Furthermore, each of the second unit shaped elements 55 may have a cross section corresponding to the part of the circle or the part of the ellipse.

In the above embodiment, one example, in which all of the second unit shaped elements 55 of the optical sheet 40 have the same configuration, has been described. However, the configuration of each of the second unit shaped elements 55 is not limited to this example. For instance, various kinds of second unit shaped elements 55, different from one another, in at least one of the height, cross section and the like, may be included in the optical sheet 40.

Further, in the above embodiment, one example, in which the adjacent second unit shaped elements 55 are arranged without any space or interval provided therebetween, has been described. The arrangement manner of the second unit shaped elements 55 is not limited to this example. For instance, the adjacent second unit shaped elements 55 may be arranged, with such a proper space or gap provided therebetween that will cause no problems on the optical properties, such as the light directly passing through the optical sheet 40 without changing the travel direction or the like. Furthermore, there may be a region, in which none of the first unit shaped elements 50 and second unit shaped elements 55 is arranged, on the one surface 46 of the main body 45.

Additionally, the optical sheet 40 may have some light diffusing function in itself. For instance, the main body 45 may includes an additional light diffusing layer (or intermediate matted layer) between the one surface 46 and the other surface 47 thereof. Such a light diffusing layer (or intermediate matted layer) may be provided as a layer including a base part and a light diffusing agent dispersed in the base part. That is to say, this light diffusing layer containing such a light diffusing agent can exhibit the light diffusing function, by obtaining a light reflecting function exhibited by the light diffusing agent, or by obtaining the refractive index substantially different from the refractive index of the base part due to the presence of the light diffusing agent therein. Alternatively or additionally, the other surface 47 of the main body 45 may be composed of the light diffusing layer (i.e., a rear-face-side matted layer). Such a light diffusing layer (or rear-face-side matted layer) may be provided as a light-diffusing-agent containing layer constructed in the same manner as the aforementioned intermediate matted layer, or otherwise may be another proper layer having a concavo-convex surface formed thereon, such as by embossing and/or hair-line process.

The optical sheet 40 may include an antistatic layer. That is to say, by adding the antistatic layer to the optical sheet 40, an antistatic function can be provided to the entire main body 45. With this variation, attachment of foreign materials, such as dust or the like, to the optical sheet 45 can be substantially reduced. As such, occurrence of negative impact on the optical properties due to such dust or the like can be successfully avoided. Alternatively or additionally, the aforementioned light diffusing layer may also have the antistatic function.

Further, in the above embodiment, one example, in which the arrangement direction of the elongated second unit shaped elements 55 and the arrangement direction of the elongated light emitting units of the light source 25 are parallel with each other, has been described. However, the arrangement manner of these components is not limited to this aspect. For instance, the arrangement direction of the elongated second unit shaped elements 55 and the arrangement direction of the elongated light emitting units of the light source 25 may cross to each other, defining a certain angle therebetween (e.g., orthogonally).

In the above embodiment, one example, in which each light emitting unit of the light source 25 of the surface light source device 20 is composed of the linear cold-cathode tubes, has been described. The configuration of each light emitting unit of the light source 25 is not limited to this example. For instance, any other suitable light emitting units, such as the LEDs (Light Emitting Diodes) as the point-like light sources, the planar EL (Electro-luminescent Light source) and the like, may be used as the light source 25. Additionally, in the above embodiment, one example, in which the optical sheet 40 is applied to the direct-type surface light source device 20, has been described. However, the application of this optical sheet 40 is not limited to this example. For instance, this optical sheet 40 may be applied to the edge-light type (or also referred to as the side-light type) surface light source device. In this application, the optical sheet 40 can also exhibit substantially the same function as in the case in which the sheet 40 is applied to the direct-type surface light source 20.

Further, in the above embodiment, although one example of the general construction of the surface light source device 20 and transmission-type display device 10, in which the optical sheet 40 is incorporated, has been described, the construction of such related devices is not limited to this aspect. For instance, the arrangement of the light collecting sheet (light condensing sheet) 30, polarized-light separating film 35 and light diffusing sheet 38 may be altered as desired. Alternatively or additionally, one or more of the light collecting sheet 30, polarized-light separating film 35 and light diffusing sheet 38 may be eliminated. Otherwise, other suitable sheet-like members may be incorporated, alternatively or additionally, in the surface light source device 20 and/or transmission-type display device 10.

While several variations of the aforementioned embodiment have been shown and described, it should be appreciated that any suitable combination of such variations can also be applied to the above related devices.

EXAMPLES

Hereinafter, the present invention will be described in more detail about several examples. However, it should be noted that this invention is not in any way limited to these examples.

First Experiment

As will be described below, the transmission-type display devices respectively related to Example 1 and Example 2, as well as the transmission-type display devices respectively related to Comparative Example 1 and Comparative Example 2 are prepared. Then, for such transmission-type display devices obtained, the front brightness (front luminance), existence of the image of the light source (or light source image) and angle of visibility are assessed.

Construction of the Transmission-Type Display Device

Example 1

Figure 9:
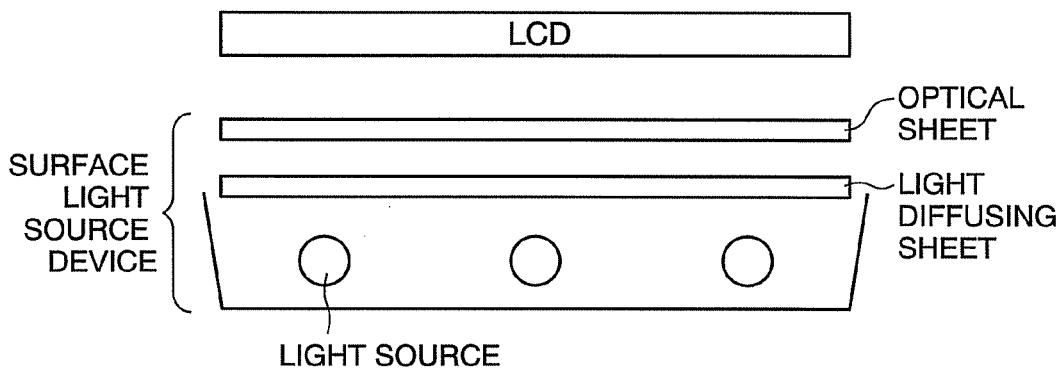
FIG. 9 is a diagram corresponding to FIG. 1 and is a diagram for explaining one exemplary construction of the transmission-type display device related to the Example.

By using a commercially available 32-inch type liquid crystal display device, the transmission-type display device related to the Example 1 and composed of the surface light source device and liquid crystal display panel (or transmission-type display unit) was prepared. In this case, as shown in FIG. 9, the surface light source device included the light source composed of the plurality of linear cold-cathode tubes, the reflector provided to surround the light source, the light diffusing sheet located on the light outgoing side of the light source, and the optical sheet located on the light outgoing side of the light diffusing sheet. Further, the liquid crystal panel was located on the light outgoing side of the optical sheet.

The light diffusing sheet was composed of the base part and light diffusing particles having the refractive index substantially different from the refractive index of the base part and dispersed in the base part. It is noted that the components other than the optical sheet, i.e., the light diffusing sheet, light source, reflector and transmission-type display unit were provided, by utilizing those incorporated in the commercially available liquid crystal display device.

The optical sheet was formed as described in the above embodiment. That is to say, this optical sheet included the sheet-like main body, the first unit shaped elements arranged on the main body and constituting together the fly-eye lens, and the second unit shaped elements arranged between the first unit shaped elements and extending in the one direction on the main body.

The first unit shaped elements, as shown in FIG. 2, were arranged on the one surface (i.e., the light outgoing side surface) of the main body, while being slightly spaced away from one another, as compared with the so-called two-dimensional closed-packed structure thereof. Each of the first unit shaped elements had a shape corresponding to a part of the spheroid, and the pitch between the nearest adjacent two of these first unit shaped elements was set at 40 μm. The diameter of the bottom circular face of each of the first unit shaped elements was 30 μm. Further, the height of the projection of each of the first unit shaped elements from the main body was 15 μm.

The second unit shaped elements were arranged in the direction (i.e., the other direction) orthogonal to the longitudinal direction (i.e., the one direction) of each of the second unit shaped elements. In the transmission-type display device related to the Example 1, the optical sheet was incorporated in the surface light source device, such that the arrangement direction of the second unit shaped elements was orthogonal to the arrangement direction of the light source (i.e., the cold-cathode tubes). Each of the second unit shaped elements had the isosceles triangle shape having a base of 10 μm and the vertex angle of 90° between the equal sides, in the cross section vertical to the longitudinal direction thereof. However, the apex or vertex of this isosceles triangle was chamfered so as to form a rounded portion with a 4 μm radius of curvature.

Example 2

By using the light source, reflector, light diffusing sheet, optical sheet and transmission-type display unit, respectively the same as those used in the above Example 1, the transmission-type display device related to the Example 2 was prepared. In the transmission-type display device related to this Example 2, the optical sheet was incorporated in the surface light source device, such that the arrangement direction of the second unit shaped elements was parallel with the arrangement direction of the light source (or cold-cathode tubes). However, the other construction of the transmission-type display device of this Example 2 was the same as the construction of the transmission-type display device related to the Example 1.

Comparative Example 1

By using the light source, reflector, light diffusing sheet and transmission-type display unit, respectively the same as those used in the above Example 1, the transmission-type display device related to the Comparative Example 1 was prepared. However, in the Comparative Example 1, the optical sheet which was different from the optical sheet of the Example 1 was provided between the light diffusing sheet and the transmission-type display unit. That is to say, the transmission-type display device related to this Comparative Example 1 was different, only in the optical sheet used therein, from the above Examples 1 and 2.

The optical sheet related to the Comparative Example 1 was composed of the sheet-like main body and the multiple unit shaped elements arranged on the main body and constituting together the fly-eye lens. In this case, the unit shaped elements are arranged in a random manner on the one surface (i.e., the light outgoing side surface) of the main body. Although the unit shaped elements had a shape corresponding to the part of the spheroid, they were different in the size from one another. The average diameter of the bottom circular shape of these unit shaped elements was set at 30 µm. Further, the average height of the projection of the unit shaped elements from the main body was set at 15 µm.

Only the unit shaped elements constituting together the fly-eye lens were arranged on the main body of the optical sheet related to the Comparative Example 1, while the second unit shaped elements (i.e., the unit prism elements or the like) extending linearly were not provided thereon. In each region of the one surface of the main body, on which the unit shaped elements were not arranged, the flat and smooth light outgoing side surface of the main body was exposed. On the one surface of the main body, the region that was occupied by the unit shaped elements was approximately 70% relative to the whole area.

Comparative Example 2

By using the light source, reflector, light diffusing sheet and transmission-type display unit, respectively the same as those used in the above Example 1, the transmission-type display device related to the Comparative Example 2 was prepared. In the surface light source device related to this Comparative Example 2, the optical sheet was not incorporated. That is to say, except for the optical sheet, the transmission-type display device related to this Comparative Example 2 had the same construction as the construction of the transmission-type display device related to the Example 1.

[Assessment]
(Assessment 1)

The front brightness (front luminance) [cd/m$^2$] was measured, for the transmission-type display devices of the above Examples 1 and 2 as well as the transmission-type display devices of the above Comparative Examples 1 and 2, with the white color displayed thereon. For the measurement of the brightness (luminance), a BM-7 apparatus produced by TOPCON Co., Ltd. was used. The results of this brightness measurement are shown in Table 1. In this Table 1, the ratio of measured value for each transmission-type display device relative to the measured value for the transmission-type display device of the Comparative Example 2 is shown in percentages. As is apparently seen from Table 1, the front brightness of the transmission-type display devices respectively related to the Examples 1 and 2 was higher than the front brightness of the transmission-type display devices respectively related to the Comparative Examples 1 and 2.

(Assessment 2)

Each of the transmission-type display devices, respectively related to the Examples 1 and 2 and Comparative Example 1, was positioned, with the light emitting surface (i.e., the sheet surface of the optical sheet) of the surface light source device extending in the vertical direction, as well as the longitudinal direction of the light source extending in the horizontal direction. Then, the brightness (luminance) was measured, in various directions in the horizontal plane, while the measurement angle relative to the front direction was changed, with the white color displayed on each transmission-type display device. In this manner, the angular distribution of the brightness (luminance) in the horizontal plane (or plane extending along the longitudinal direction of the light source) was first obtained. Similarly, the angular distribution of the brightness (luminance) in the vertical plane (or plane orthogonal to the longitudinal direction of the light source) was also obtained, while the measurement angle was changed in the vertical direction. For this measurement, an EZ-contrast apparatus, produced by ELDI Co., Ltd. in France, was used. From the measured values of the angular distribution of the brightness, the angle (or mitering angle) at which the brightness measured was a half of the highest brightness, i.e., the front brightness, and the angle (or ⅓ angle) at which the brightness measured was a third (⅓) of the highest brightness, i.e., the front brightness, were determined. The results are also shown in Table 1. In Table 1, αV designates the angle in degrees (°), at which the brightness in the angular distribution of the brightness measured in the vertical plane was the half, as compared with the level of the front brightness, αH designates the angle in degrees (°), at which the brightness in the angular distribution of the brightness measured in the horizontal plane was the half, as compared with the front brightness, βV denotes the angle in degrees (°), at which the brightness in the angular distribution of the brightness measured in the vertical plane was a third, as compared with the level of the front brightness, and βH denotes the angle in degrees (°), at which the brightness in the angular distribution of the brightness measured in the horizontal plane was a third, as compared with the front brightness. With respect to all of the angles αV, αH, βV and βH, each value measured for the transmission-type display devices respectively related to the Examples 1 and 2 was greater than the value of the transmission-type display device related to the Comparative Example 1.

(Assessment 3)

For the transmission-type display devices respectively related to the Examples 1 and 2 and Comparative Examples 1 and 2, whether or not the image of the light source can be visually confirmed, with the white color displayed thereon, was determined with eyes. The results of this assessment are also shown in Table 1. In this Table 1, each display device in which the image of the light source could not be visually confirmed is designated by "○ (circle mark)", while each display device in which the image of the light source was apparently observed is denoted by "X (multiple mark)". Further, "□ (triangle mark)" denotes the display device in which the image of the light source could not be usually noticed, while this image could be visually confirmed when stared at.

TABLE 1

Results of the assessment

| | | Example 1 | Example 2 | Comparative Example 1 | Comparative Example 2 |
|---|---|---|---|---|---|
| Front brightness (%) | | 118 | 115 | 111 | 100 |
| Angle of visibility (°) | αV | 50 | 49 | 49 | — |
| | αH | 50 | 52 | 49 | — |
| | βV | 63 | 63 | 58 | — |
| | βH | 62 | 64 | 57 | — |
| Light source image | | ○ (circle) | ○ (circle) | □ (triangle) | X |

Second Experiment

As will be described below, the transmission-type display devices respectively related to Examples A to D, as well as the transmission-type display device related to Comparative Example A were prepared. Then, for such prepared transmission-type display devices, the front brightness (front luminance), hiding rate (or rate of blurring the light source image) and angle of visibility were assessed.

Construction of the Transmission-Type Display Device

Examples A to D

The transmission-type display devices respectively related to the Examples A to D were prepared in the same manner as in the case of the aforementioned Example 2. That is to say, each of the transmission-type display devices related to the Examples A to D was composed of the surface light source and liquid crystal display panel (or transmission-type display unit), wherein the surface light source device included the light source composed of the cold-cathode tubes, as well as the reflector, light diffusing sheet and optical sheet. The light source, reflector and light diffusing sheet are provided, by utilizing those incorporated in the commercially available transmission-type display device. The light source, reflector and light diffusing sheet were the same, in each of the transmission-type display devices related to the Examples A to D. However, the light source, reflector and light diffusing sheet used in each of the transmission-type display devices related to the Examples A to D were respectively different from the light source, reflector and light diffusing sheet used in the transmission-type display device related to the Example 2.

Each optical sheet was composed of the sheet-like main body, the first unit shaped elements arranged on the main body and constituting together the fly-eye lens, and the second unit shaped elements arranged between the first unit shaped elements and extending in the one direction on the main, body. In the optical sheet of each transmission-type display device related to the Examples A to D, the arrangement manner of the first unit shaped elements was the same as the arrangement manner (see FIG. 2) described in the above embodiment. However, in these Examples A to D, the first direction d1 is set to be parallel with the arrangement direction of the second unit shaped elements. In addition, the arrangement direction of the second unit shaped elements was parallel with the arrangement direction of the cold-cathode tubes of the light source. Further, the second unit shaped elements were arranged along the arrangement direction thereof without any space or gap provided therebetween. Additionally, in the same manner as in the Example 2, each of the second unit shaped elements had the cross section of the isosceles right triangle shape, and was arranged on the main body, while being symmetrical about the front direction. In these Examples A to D, the vertex angle or apex of each of the second unit shaped elements was not chamfered.

Except for the above points as well as except for shape, size, and space or interval in the arrangement, the optical sheet of the transmission-type display devices respectively related to the Examples A to D had the same construction as the construction of the optical sheet in the aforementioned Example 2. The shape, size, and space or interval in the arrangement of each optical sheet of the transmission-type display devices respectively related to the Examples A to D were set as shown in FIG. 10. In FIG. 10, the heights H1, H2, width W1 (in this example, this width corresponds to the diameter of the circle as the bottom face of each of the first unit shaped elements arranged on the main body), pitches P1, P2 (in this example, this pitch P2 corresponds to the width W2 of each of the second unit shaped elements), average Sa of the least space, and vertex angle θ respectively denote those described in the above embodiment (see FIGS. 2 and 4). Meanwhile, "Packing ratio" described in FIG. 10 denotes the ratio of the area that is covered with the first unit shaped elements on the one surface of the main body. Further, in each section of "External appearance" described in FIG. 10, the external appearance of the light outgoing side surface of each optical sheet is schematically depicted. In each schematic external appearance of the optical sheets, the second unit shaped elements are shown by straight lines extending in the lateral direction for designating respective peak lines and valley lines thereof. Accordingly, the interval between the two adjacent straight lines extending in the lateral direction depicted in each section of "External appearance" of the table of FIG. 10 corresponds to a half of the pitch P2 of the second unit shaped elements (i.e., the width W2 of each of the second unit shaped elements). Because each of the first unit shaped elements is connected with one or more second unit shaped elements, each having the triangular cross-sectional shape, such a first unit shaped element has in nature a slightly deformed circular shape, when seen in a top view from the light outgoing side surface. However, in FIG. 10, for better understanding and clarity of the external appearance of each optical sheet, each of the first unit shaped elements is depicted as a simple circular shape.

Comparative Example A

Except for the construction of the optical sheet, the transmission-type display device related to the Comparative Example A was constructed in the same manner as the transmission-type display devices respectively related to the Examples A to D. That is to say, the optical sheet related to the Comparative Example A included the sheet-like main body and multiple unit shaped elements arranged on the main body and constituting together the fly-eye lens. In other words, the optical sheet related to the Comparative Example A was not provided with the linear prisms corresponding to the second unit shaped elements provided in the optical sheets respectively related to the Examples A to D.

The shape of each unit shaped element provided in the optical sheet of the Comparative Example A was the same as that of each of the first unit shaped elements of the optical sheets respectively related to the Examples A to D. In this Comparative Example A, the unit shaped elements, each having the circular bottom face, were arranged on the one surface of the main body, at a possibly high packing ratio. More specifically, because of the limitations in the current production technique, the unit shaped elements could be arranged in this Comparative Example A, while being not contacted with one another, as shown in FIG. 10, with an average gap or space of approximately 4 μm provided between the two adjacent unit shaped elements.

[Assessment]
(Assessment 1)

For the transmission-type display devices respectively related to the Examples A to D and Comparative Example A, the front brightness (front luminance) was measured in the same manner as described in the above First experiment. The results are also shown in FIG. 10. In FIG. 10, the ratio of each measured value for the transmission-type display devices related to the above examples and comparative Example, relative to the measured value for the transmission-type display device of the Comparative Example 2, is shown in percentages. As is apparently seen from FIG. 10, the front brightness of the transmission-type display devices respectively related to the Examples B to D was higher than the front brightness of the Comparative Example A and Example A.

(Assessment 2)

For the transmission-type display devices respectively related to the Examples A to D and Comparative Example A, the angular distribution of the brightness (luminance) was measured in the same manner as described in the above First experiment, thereby obtaining the αH and αV. The results are shown in FIG. 10. As is seen from FIG. 10, the αH was improved, while the αV was lowered, in the Examples A to D, as compared with the Comparative Example A. In particular, in the Examples B to D, the αV was markedly lowered, as compared with the Comparative Example A. This proves that the transmission-type display devices respectively related to the Examples A to D, especially the transmission-type display devices related to the Examples B to D, can exhibit excellent optical properties that can be considered to be ideal for the television set for household use. That is to say, such transmission-type display devices can provide a significantly wide and adequate angle of visibility in the horizontal direction as well as can efficiently utilize the light emitted from the light source, thereby ensuring significantly excellent front brightness (front luminance).

(Assessment 3)

For the transmission-type display devices respectively related to the Examples A to D and Comparative Example A, the front brightness (front luminance) was measured, with the white color displayed thereon, so as to obtain the in-plane distribution of the front brightness along the arrangement direction of the cold-cathode tubes constituting together the light source. As a result, for each transmission-type display device, the front brightness was changed with a cycle corresponding to the cycle or interval in the arrangement of the cold-cathode tubes. That is to say, the front brightness measured at a point immediately above each cold-cathode tube was relatively high, while the front brightness measured at a point facing each intermediate point between two adjacent cold-cathode tubes was relatively low. From the measurement results of the in-plane distribution of such front brightness cyclically changed in this manner, one section corresponding to any given one cold-cathode tube was selected, and then average brightness Iav as well as the maximum brightness Imax over this section were obtained. Thereafter, for each transmission-type display device, the ratio of the maximum brightness Imax relative to the average brightness Iav was obtained as the hiding ratio I (i.e., I=(Imax)/(Iav)×100(%)). While each hiding ratio I was obtained as a value of 100% or higher, the image of each cold-cathode tube was less likely to be visually confirmed, as this value was closer to 100%. The results are shown in FIG. 10. As apparently seen from these results shown in FIG. 10, the hiding ratio I was considerably improved in the Examples A to D, as compared with the Comparative Example A. In particular, in the Examples B to D, this hiding ratio I was significantly improved (i.e., each value I obtained in these examples could significantly approach 100%), as compared with the Comparative Example A.

The invention claimed is:

1. An optical sheet comprising:
a sheet-like main body;
first unit shaped elements arranged two-dimensionally on one surface of the main body, the first unit shaped elements together constituting a fly-eye lens and being arranged with spaces therebetween on the one surface of the main body; and
second unit shaped elements arranged between the first unit shaped elements on the one surface of the main body, the second unit shaped elements extending in parallel with one direction on a sheet surface of the main body;
wherein the optical sheet comprises a light incident-side surface and an opposed light outgoing-side surface;
wherein a height of a projection of each first unit shaped element extending from the one surface of the main body is higher than a height of a projection of each second unit shaped element extending from the one surface of the main body, and a width of each first unit shaped element along an arrangement direction of the second unit shaped elements is wider than a width of each second unit shaped element along the arrangement direction of the second unit shaped elements so that at least part of the second unit shaped elements are divided into sections by the first unit shaped elements; and
wherein each of the second unit shaped elements has a triangular shape, in a cross-sectional view thereof taken parallel with a normal direction relative to the sheet surface of the main body and orthogonal to the one direction.

2. The optical sheet according to claim 1,
wherein each of the first unit shaped elements has a shape corresponding to a part of an ellipse or to a part of a circle, in a cross-sectional view thereof taken parallel with a normal direction relative to the sheet surface of the main body.

3. The optical sheet according to claim 1,
wherein a partial area of the one surface of the main body is covered with the first unit shaped elements; and
wherein a remainder of the area of the one surface of the main body, other than the partial area of the one surface of the main body, is covered with the second unit shaped elements.

4. The optical sheet according to claim 1,
wherein the projection height of each of the second unit shaped elements from the one surface of the main body is equal to or less than 9/10 of the projection height of each of the first unit shaped elements from the one surface of the main body.

5. The optical sheet according to claim 1,
wherein the first unit shaped elements are arranged in a first direction, with a constant pitch, along the sheet surface of the main body, and in a second direction, with the constant pitch, along the sheet surface of the main body; and
wherein the first direction crosses to the second direction, defining a 60° angle therebetween.

6. The optical sheet according to claim 1,
wherein an average space between immediately adjacent ones of the first unit shaped elements, which is an average of the spaces along the sheet surface of the main body between one of the first unit shaped elements and another of the first unit shaped elements arranged nearest to the one first unit shaped element along the sheet surface of the main body, is equal to or greater than an arrangement pitch of the second unit shaped elements along a direction orthogonal to the one direction on the sheet surface of the main body.

7. The optical sheet according to claim 6,
wherein the first unit shaped elements are arranged in a first direction, with a constant pitch, along the sheet surface of the main body, and in a second direction, with the constant pitch, along the sheet surface of the main body; and wherein the first direction is orthogonal to the one direction, and crosses to the second direction, defining the 60° angle therebetween.

8. The optical sheet according to claim 6, wherein the first unit shaped elements are arranged in a random manner on the one surface of the main body.

9. A surface light source device, comprising:
a light source; and
the optical sheet according to claim 1, arranged to receive light emitted from the light source.

10. The surface light source device according to claim 9, further comprising a light collecting sheet, which includes unit shaped elements, each of which having a triangular section shape.

11. The surface light source device according to claim 9, further comprising a polarized-light separating film located on a light outgoing-side relative to the optical sheet.

12. A transmission-type display device, comprising:
a transmission-type display unit; and
the surface light source device according to claim 9 disposed to be opposed to the transmission-type display unit.

13. The optical sheet according to claim 1, wherein the second unit shaped elements constitute a linear-array optical element.

14. An optical sheet comprising:
a sheet-like main body;
first unit shaped elements arranged two-dimensionally on one surface of the main body, the first unit shaped elements together constituting a fly-eye lens and being arranged with spaces therebetween on the one surface of the main body; and
second unit shaped elements arranged between the first unit shaped elements on the one surface of the main body, the second unit shaped elements extending in parallel with one direction on a sheet surface of the main body,
wherein the optical sheet comprising a light incident side surface and an opposed light outgoing-side surface opposite to the light incident side surface;
wherein a height of a projection of each first unit shaped element from the one surface of the main body is higher than a height projection of each second unit shaped element from the one surface of the main body, and a width of each first unit shaped element along an arrangement direction of the second unit shaped elements is wider than a width of each second unit shaped element along the arrangement direction of the second unit shaped elements so that at least part of the second unit shaped elements are divided into sections by the first unit shaped elements;
wherein a partial area of the one surface of the main body is covered with the first unit shaped elements; and
wherein a remainder of the area of the one surface of the main body, other than the partial area of the one surface of the main body, is covered with the second unit shaped elements.

* * * * *